(12) United States Patent
Suzuki

(10) Patent No.: US 6,871,009 B1
(45) Date of Patent: Mar. 22, 2005

(54) IMAGE STORAGE SYSTEM, IMAGE STORAGE METHOD AND STORAGE MEDIUM

(75) Inventor: Takatoshi Suzuki, Ohta-ku (JP)

(73) Assignee: Canon Kabushiki Kaisha (JP)

(*) Notice: Subject to any disclaimer, the term of this patent is extended or adjusted under 35 U.S.C. 154(b) by 0 days.

(21) Appl. No.: 09/559,857

(22) Filed: Apr. 27, 2000

(30) Foreign Application Priority Data

Apr. 27, 1999 (JP) .......................................... 11-119525

(51) Int. Cl.[7] ................................................ H04N 5/91
(52) U.S. Cl. ........................ 386/95; 386/120; 386/121; 348/231.2
(58) Field of Search ...................... 348/207.1, 333.11, 348/231.99, 231.2, 231.1; 386/46, 95, 124, 117, 121, 120; H04N 5/91

(56) References Cited

U.S. PATENT DOCUMENTS

| | | | | |
|---|---|---|---|---|
| 5,706,097 A | * | 1/1998 | Schelling et al. | ........... 345/723 |
| 6,020,982 A | * | 2/2000 | Yamauchi et al. | ........ 358/909.1 |
| 6,658,202 B1 | * | 12/2003 | Battaglia et al. | ............ 386/124 |
| 6,718,118 B1 | * | 4/2004 | Oguro | .......................... 386/46 |

FOREIGN PATENT DOCUMENTS

JP          8-63486          3/1996

* cited by examiner

Primary Examiner—Vincent Boccio
(74) Attorney, Agent, or Firm—Rossi, Kimms & McDowell

(57) ABSTRACT

This invention provides an image storage apparatus, which is capable of quickly and easily downloading images from an electronic film, and which is manufactured at low costs. When an instruction is given to copy the images stored in a CF card to an HDD, the image storage apparatus performs a control to receive the images from the CF card and copy them to the HDD without generating any thumbnail images for managing the images copied into the HDD.

8 Claims, 15 Drawing Sheets

IMAGE STORAGE SYSTEM, IMAGE STORAGE METHOD AND STORAGE MEDIUM

BACKGROUND OF THE INVENTION

1. Field of the Invention

This invention relates to an image storage apparatus, an image storage method, and a storage medium for capturing and storing image data taken by a digital camera and the like.

2. Description of Related Art

In recent years, digital cameras have been produced as consumer appliances due to the technical progress of semiconductors, and ordinary people have been using them. The digital cameras are different from ordinary cameras in that the digital cameras can take a great number of pictures, a user can immediately regenerate and confirm the pictures, and the user can erase the failed picture and take a picture again. This enables the user to take pictures without worrying about failures.

In the conventional digital cameras, a flash memory in the digital camera is used for recording the captured data. When a memory capacity of the flash memory is full, the user downloads the data of the flash memory into a general purpose computer or special equipment by using a communication means such as RS232C and IrDA and then erases the data from the flash memory. Then, the user takes a picture again.

Recently, however, a removable medium as an electronic film, which can be used in the same manner as film of a silver halide camera, has been used as a memory for recording data captured by the digital cameras. When the removable medium is full, it can be replaced by a new removable medium. This enables the user to take pictures without worrying about the capacity of the medium.

The removable medium as the electronic film includes a PC card (PCMCIA) adopted from a notebook computer. Due to the reduction in the size of the digital camera, a CF (Compact Flash) card smaller than the PC card has been increasingly used as the removable medium.

The mainstream size of an image taken by the digital camera was a VGA size (640 pixels×480 pixels) taken by a CCD of a 350,000 pixel class in the early stages. Now, the mainstream image size is an XGA size (1024 pixels×768 pixels) of an 800,000 pixels class and an SXGA (1280 pixels×1024 pixels) of a 1,300,000 class. The image size of some digital cameras is of higher quality close to the image size of a silver halide camera. Accordingly, the electronic film is required to have a larger capacity.

Most of the taken images are now handled by a system using a general purpose computer (PC) as shown in FIG. 1. FIG. 1 shows a conventional system using the general purpose PC.

In FIG. 1, reference numeral 100 denotes the general purpose computer (e.g., a PC for Windows 95); 101, a PC card reader; 102, an SCSI used as an interface standard for connecting to PC peripheral equipment; 103, a CF card used as electronic film for the digital camera; and 104, a CF adapter for converting the CF card 103 into a PC card.

A description will now be given of the procedure for downloading data in this system. First, a power supply for the general purpose PC 100 and the PC card reader is turned on to activate the system. Then, an application for managing images is activated.

Then, the CF card adapter 104 is attached to the CF card 103, which contains image data taken by the digital camera. Consequently, the CF card 103 is converted into an interface of the PC card, and is used as a normal PC card. The PC card is inserted into a slot of a PC card interface of the PC card reader 101.

From an application (for example an image management software currently on the market) operating on the general purpose PC 100, the CF card 103 inserted into the PC card reader 101 is seen as an SCSI drive. Necessary image data are captured from the CF card 103 seen as the SCSI drive by means of the application. At the same time, the application produces thumbnail images for every image in order to manage the images. The selected images are processed using a list of the thumbnail images; for example, the edition (e.g., 90°—rotation and trimming) and the slide show of the images.

The above sequence of operation requires the steps of activating the computer and the application software. This requires a lot of time for downloading the images recorded in the CF card.

To address this problem, there has been developed an image storage apparatus that replaces the PC, which takes a lot of time to activate. The image storage apparatus preferably has a function of easily storing the images of the electronic film, and a function of erasing the images from the electronic film and reusing the electronic film, and is preferably capable of executing these functions quickly. Moreover, the image storage apparatus preferably has a function of enabling a family to look at images on a TV in a living room and the like. In addition, the cost of the image storage apparatus needs to be lowered as much as possible.

Such an image storage apparatus handles original images and corresponding thumbnail images, and manages the original images by means of the thumbnail images. For example, if a plurality of original images are stored, as many thumbnail images are stored in correlation with the respective original images and are displayed as indices for indicating the original images. A desired thumbnail image is selected from the thumbnail images displayed as indices in order to designate the original image to be processed. The designated original image is read and displayed in a large size on a TV, or is edited.

In the digital camera, an LCD (a liquid crystal display) is attached to a body of the camera, or a function of outputting the taken images to a TV is provided at the body of the camera. Thumbnail images corresponding to the taken original images are generated and used for managing the original images.

Ordinarily, the size of the thumbnail image differs (e.g., 80 pixels×60 pixels and 96 pixels×64 pixels) according to the types and manufacturers of the digital cameras. In many cases, the size of thumbnail images generated by the digital camera is different from the size of thumbnail images handled by the image storage apparatus.

To address this problem, the image storage apparatus is provided with a means for generating thumbnail images from original image data captured from the electronic film. Japanese Patent Provisional Publication No. 8-63486 discloses what kinds of directories are used to manage the images.

The conventional image storage apparatus, however, must generate the thumbnail images for managing the images. To generate the thumbnail images, the JPEG-encoded original image data must be JPEG-decoded and resized to the size of thumbnail images. Therefore, it takes much time to generate the thumbnail images, and it is difficult to complete the whole process within a short time even in the case where the image data in the electronic film are downloaded from the electronic film, which are then used as new electronic film in the digital camera.

SUMMARY OF THE INVENTION

A first object of the present invention is to provide an image storage apparatus, an image storage method and a storage medium, which are capable of quickly and easily downloading images from a storage medium as an electronic film, and which are constructed at low costs.

A second object of the present invention is to provide an image storage apparatus, an image storage method and a storage medium, which are capable of reducing the time required for downloading including generation of thumbnail images for managing images.

A third object of the present invention is to provide an image storage apparatus, an image storage method and a storage medium, which are capable of reducing the time required for generating thumbnail images for managing images.

A fourth object of the present invention is to provide an image storage apparatus, an image storage method and a storage medium, which are capable of increasing the speed at which thumbnail images corresponding to images inputted from the storage medium used as electronic film are displayed.

The first object can be-accomplished by providing an image storage apparatus comprising: receiving means for receiving images stored in a storage medium; storage means for storing the images received through the receiving means from the storage medium; thumbnail image generating means for generating thumbnail images of a predetermined size for managing the images stored in the storage means; copy instruction means for giving an instruction to copy the images stored in the storage medium into the storage means; and control means for executing a control in such a manner as to receive the images from the storage medium through the receiving means and copy the images stored in the storage medium into the storage means without generating any thumbnail images by the thumbnail image generating means, when the copy instruction means gives the instruction to copy the images in the storage medium into the storage means.

According to this structure, the image data can be downloaded quickly and easily from the storage medium as the electronic film, and the image storage apparatus can be constructed at low costs.

In one preferred mode of the present invention, the image storage apparatus further comprises erasing means for erasing images from the storage medium after the images in the storage medium are copied into the storage means. According to this structure, the capacity which may be used for the storage medium can easily be secured after the images are copied from the storage medium into the storage means.

In one preferred mode of the present invention, the image storage apparatus further comprises display means for displaying images stored in the storage means. This enables the easy confirmation of the images stored in the storage means and the thumbnail images of the predetermined size.

In one preferred mode of the present invention, the copy instruction means has a switch that can be operated by a user, and when the switch is operated, the copy instruction means outputs a signal indicative of the copy instruction to the control means. According to this structure, the copy instruction can easily be given.

In one preferred mode of the present invention, the copy instruction means comprises a remote control unit having a copy instruction button, and when the button is operated, the copy instruction means outputs the signal indicative of the copy instruction to the control means. According to this structure, the copy instruction can easily be given.

The second object can be accomplished by providing an image storage apparatus comprising: receiving means for receiving images and thumbnail images for managing the images stored in a storage medium; storage means for storing the images and the thumbnail images received through the receiving means from the storage medium; thumbnail image generating means for generating thumbnail images of a predetermined size; thumbnail image size detecting means for detecting a size of the thumbnail images stored in the storage medium; copy instruction means for giving an instruction to copy the images stored in the storage medium to the storage means; and control means for executing a control in such a manner as to receive the images from the storage medium through the receiving means and copy the images stored in the storage medium to the storage means when the copy instruction means gives the instruction to copy the images in the storage medium into the storage means; and wherein if the size of the thumbnail images in the storage medium corresponds to the predetermined size, the control means executes a control in such a manner as to receive the thumbnail images from the storage medium through the receiving means and copy the received thumbnail images into the storage means as management thumbnail images for the images copied into the storage means.

This reduces the time required for the downloading process including the generation of the thumbnail images for managing the images.

In one preferred mode of the present invention, if the size of the thumbnail images stored in the storage medium is different from the predetermined size, the control means executes a control in such a manner as to generate thumbnail images of the predetermined size corresponding to the images copied into the storage means by the thumbnail image generating means and store the generated thumbnail images as the management thumbnail images in the storage means.

In one preferred mode of the present invention, the image storage apparatus further comprises display means for displaying the images stored in the storage means and the thumbnail images of the predetermined size. This enables the easy confirmation of the images and the thumbnail images of the predetermined size stored in the storage means.

In one preferred mode of the present invention, the copy instruction means has a switch that can be operated by a user, and when the switch is operated, the copy instruction means outputs a signal indicative of the copy instruction to the control means. According to this structure, the instruction to copy the images can be given easily.

In one preferred mode of the present invention, the copy instruction means comprises a remote control unit having a copy instruction button, and when the button is operated, the copy instruction means outputs a signal indicative of the copy instruction to the control means. According to this structure, the instruction to copy the images can be given easily.

The third object can be accomplished by providing an image storage apparatus comprising: storage means containing at least images; thumbnail image detecting means for detecting whether thumbnail images of a predetermined size are stored in the storage means; thumbnail image generating means for generating thumbnail images of the predetermined size; and control means for executing a control in such a manner as to store again, in the storage means, the thumbnail images of the predetermined size stored in the storage means as thumbnail images for managing the images stored in the storage means.

This reduces the time required for the downloading process including the generation of the thumbnail images for managing the images.

In one preferred mode of the present invention, if the storage means does not contain any thumbnail images of the predetermined size, the control means executes a control in such a manner as to generate thumbnail images of the predetermined size corresponding to the images stored in the storage means by the thumbnail image generating means and store, in the storage means, the generated thumbnail images as thumbnail images for managing the images stored in the storage means.

In one preferred mode of the present invention, the image storage apparatus further comprises display means for displaying the images stored in the storage means and the thumbnail images of the predetermined size. This enables the easy confirmation of the images and the thumbnail images of the predetermined size stored in the storage means.

The fourth object of the present invention can be accomplished by providing an image storage apparatus comprising: receiving means for receiving images and thumbnail images stored in a storage medium from the storage medium; thumbnail image size detecting means for detecting a size of thumbnail images in the storage medium; thumbnail image generating means for generating thumbnail images of a predetermined size corresponding to the images received from the storage medium through the receiving means; display means for displaying the images and the thumbnail images; display control means for executing a control in such a manner as to display the images and the thumbnail images on the display means; and wherein if the size of the thumbnail images in the storage medium corresponds to the predetermined size, the display control means executes a control in such a manner as to display, on the display means, the thumbnail images received from the storage medium through the receiving means, and if the size of the thumbnail images in the storage medium is different from the predetermined size, the display control means executes a control in such a manner as to generate thumbnail images of the predetermined size by the thumbnail image generating means and display the generated thumbnail images of the predetermined size on the display means.

This increases the speed at which the thumbnail images corresponding to the images received from the storage medium as the electronic film are displayed.

In one preferred mode of the present invention, the image storage apparatus further comprises: storage means for containing the images received from the storage medium and the thumbnail images of the predetermined size; designating means for designating the thumbnail images of the predetermined size displayed on the display means; storage control means for executing a control to receive images corresponding to the thumbnail images designated by the designating means from the storage means through the receiving means and store, in the storage means, the received images and the thumbnail images of the predetermined size corresponding to the received images. This makes it possible to easily select desired images from the images stored in the storage medium, and eliminates the necessity of generating thumbnail images corresponding to the captured images. Consequently, the desired images can be captured quickly and easily.

The first object can also be accomplished by providing an image storage method comprising the steps of: generating thumbnail images for managing images inputted from a storage medium when the images are inputted from the storage medium; giving an instruction to copy the images in the storage medium into storage means; executing a control in such a manner as to receive the images from the storage medium and copy the received images into the storage means without generating the thumbnail images when the instruction is given.

According to this structure, the image data can be downloaded quickly and easily from the storage medium as the electronic film, and the image storage apparatus can be constructed at low costs.

In one preferred mode of the present invention, the image storage method further comprises the step of erasing the images from the storage medium after receiving the images in the stage medium and copying the received images into the storage means. According to this structure, the capacity which may be used for the storage medium can easily be secured after the images are copied from the storage medium into the storage means.

In one preferred mode of the present invention, the image storage method further comprises the step of displaying the images copied into the storage means. This enables the easy confirmation of the images and the thumbnail images of the predetermined size stored in the storage means.

The second object can also be accomplished by providing an image storage method comprising the steps of: receiving images and thumnail images stored in a storage medium; detecting a size of the thumnail images stored in the storage medium; executing a control in such a manner as to copy the received images in the storage medium into storage means; and if the size of the thumbnail images in the storage medium corresponds to a predetermined size, executing a control in such a manner as to receive the thumbnail images from the storage medium and copy the received thumbnail images into the storage means as thumbnail images for managing the images copied into the storage means.

This reduces the time required for the downloading process including the generation of the thumbnail images for managing the images.

In one preferred mode of the present invention, if the size of the thumbnail images stored in the storage medium is different from the predetermined size, a control is executed in such a manner as to generate thumbnail images of the predetermined size corresponding to the images copied into the storage means and store the generated thumbnail images as thumbnail images for managing the images in the storage means into the storage means.

In one preferred mode of the present invention, the image storage apparatus further comprises the step of displaying, on display means, the images stored in the storage means and the thumbnail images of the predetermined size. This enables the easy confirmation of the images stored in the storage means and the thumbnail images of the predetermined size.

The third object can also be accomplished by providing an image storage method comprising the steps of: detecting whether thumbnail images of a predetermined size are stored in storage means containing at least images; and if the thumbnail images of the predetermined size are stored in the storage means, executing a control in such a manner as to store again, in the storage means, the thumbnail images of the predetermined size stored in the storage means as thumbnail images for managing the images stored in the storage means.

This reduces the time required for the downloading process including the generation of the thumbnail images for managing the images.

In one preferred mode of the present invention, if the storage means does not contain any thumbnail images of the predetermined size, a control is executed in such a manner as to generate thumbnail images of the predetermined size corresponding to the images stored in the storage means and store, in the storage means, the generated thumbnail images as thumbnail images for managing the images stored in the storage means.

In one preferred mode of the present invention, the image storage method further comprises the step of displaying the images stored in the storage means and the thumbnail images of the predetermined size. This enables the easy confirmation of the images stored in the storage means and the thumbnail images of the predetermined size.

The fourth object can also be accomplished by providing an image storage method comprising the steps of: receiving images and thumbnail images stored in a storage medium from the storage medium; detecting a size of the thumbnail images in the storage medium; executing a control in such a manner as to display, on display means, the thumbnail images received from the storage medium, as thumbnail images for managing the received images if the size of the thumbnail images in the storage medium corresponds to a predetermined size, and executing a control in such a manner as to generate thumbnail images of the predetermined size and display the generated thumbnail images of the predetermined size on the display means as thumbnail images for managing the received images if the size of the thumbnail images in the storage medium is different from the predetermined size. This increases the speed at which the thumbnail images corresponding to the images received from the storage medium as the electronic film are displayed.

In one preferred mode of the present invention, the image storage method further comprises the steps of: managing the received images correspondingly to the thumbnail images of the predetermined size; designating the thumbnail images of the predetermined size displayed on the display means; executing a control in such a manner as to receive images corresponding to the designated thumbnail images from the storage medium and store, in storage means, the received images and the thumbnail images of the prededetermined size corresponding to the received images. This makes it possible to easily select desired images from the images stored in the storage medium, and eliminates the necessity of generating thumbnail images corresponding to the captured images. Consequently, the desired images can be captured quickly and easily.

The first object can also be accomplished by providing a storage medium which contains a program that can be read by an information processing apparatus, the program comprising: an image receiving module for receiving images stored in a storage medium for electronic film; a thumbnail image generating module for generating thumbnail images of a predetermined size for managing the images received through the image receiving module; a copy instruction module for giving an instruction to copy the images stored in the storage medium into storage means; and a control module for executing a control in such a manner as to receive the images from the storage medium through the image for electronic film through the image receiving module and copy the received images into the storage means without generating any thumbnail images by the thumbnail image generating module, when the copy instruction module gives the instruction to copy the images in the storage medium into the storage means.

According to this structure, the image data can be downloaded quickly and easily from the storage medium as the electronic film, and the image storage apparatus can be constructed at low costs.

In one preferred mode of the present invention, the program further comprises an erasing module for erasing the images from the storage medium after the images in the storage medium are copied into the storage means. According to this structure, the capacity which may be used for the storage medium can easily be secured after the images are copied from the storage medium into the storage means.

In one preferred mode of the present invention, the image storage apparatus further comprises a display control module for displaying, on display means, the images copied into the storage means. This enables the easy confirmation of the images and the thumbnail images of the predetermined size stored in the storage means.

The second object can also be accomplished by providing a storage medium containing a program that can be read by an information processing apparatus, the program comprising: a receiving module for receiving images and thumbnail images stored in a storage medium for electronic film from said storage medium for electronic film; a thumbnail image generating module for generating thumbnail images of a predetermined size; a thumbnail image size detecting module for detecting a size of the thumbnail images stored in the storage medium for electronic film; a copy instruction input module for inputting an instruction to copy the images stored in the storage medium for electronic film into storage means; and a control module for executing a control in such a manner as to copy the images stored in the storage medium for electronic film and received through the image receiving module into the storage means when the copy instruction input module inputs the instruction to copy the images in the storage medium into the storage means; and wherein if the size of the thumbnail images in the storage medium for electronic film corresponds to the predetermined size, the control module execute a control in such a manner as to copy the thumbnail images received through the image receiving module into the storage means as thumbnail images for managing the images copied into the storage means.

This reduces the time required for the downloading process including the generation of the thumbnail images for managing the images.

In one preferred mode of the present invention, if the size of the thumbnail images stored in the storage medium for electronic film is different from the predetermined size, the control module executes a control in such a manner as to generate thumbnail images of said predetermined size corresponding to the images stored in the storage means by the thumbnail image generating module and store the generated thumbnail images as the thumbnail images for managing the images in the storage means.

In one preferred mode of the present invention, the program further comprises a display control module for displaying, on display means, the images stored in the storage means and the thumbnail images of the predetermined size. This enables the easy confirmation of the images stored in the storage means and the thumbnail images of the predetermined size.

The third object can also be accomplished by providing a storage medium containing a program that can be read by an information processing apparatus, the program comprising: a thumbnail image detecting module for detecting whether thumbnail images of a predetermined size are stored in storage means containing at least images; a thumbnail image generating module for generating thumbnail images of the predetermined size; and a control module for executing a control in such a manner as to store again, in the storage means, the thumbnail images of the predetermined size stored in the storage means as thumbnail images for managing the images stored in the storage means, if the thumbnail images of the predetermined size are stored in the storage means.

This reduces the time required for the downloading process including the generation of the thumbnail images for managing the images.

In one preferred mode of the present invention, if the storage means does not contain any thumbnail images of the predetermined size, the control module executes a control in such a manner as to generate thumbnail images of the predetermined size corresponding to the images stored in the storage means by the thumbnail image generating module and store, in the storage means, the generated thumbnail images as thumbnail images for managing the images stored in the storage means.

In one preferred mode of the present invention, the program further comprises a display control module for displaying, on display means, the images stored in the storage means stored in the storage means and the thumbnail images of the predetermined size. This enables the easy confirmation of the images and the thumbnail images of the predetermined size.

The fourth object can also be accomplished by providing a storage medium containing a program that can be read by an information processing apparatus, the program comprising: an image receiving module for receiving images and thumbnail images stored in a storage medium for electronic film from the storage medium for electronic film; a thumbnail image size detecting module for detecting a size of the thumbnail images in the storage medium for electronic film; a thumbnail image generating module for generating thumbnail images of a predetermined size for managing the images received from the storage medium for electronic film through the image receiving module; and a display control module for displaying, on display means, at least the images and the thumbnail images; and wherein if the size of the thumbnail images stored in the storage medium for electronic film corresponds to the predetermined size, the display control module executes a control in such a manner as to display, on the display means, the thumbnail images received from the storage medium for electronic film through the image receiving module, and wherein if the size of the thumbnail images stored in the storage medium for electronic film is different from the predetermined size, the display control module executes a control in such a manner as to generate thumbnail images of the predetermined size by the thumbnail image generating module and display the generated thumbnail images of the predetermined size on the display means.

This increases the speed at which the thumbnail images corresponding to the images received from the storage medium as the electronic film are displayed.

In one preferred mode of the present invention, the program further comprises: a designating module for designating the thumbnail images of the predetermined size displayed on the display means; and a storage control module for executing a control in such a manner as to store, in storage means, the images received from the storage medium for electronic film and the thumbnail images of the predetermined size; wherein the storage control module receives images corresponding to the thumbnail images designated by the designating module from the storage medium for electronic film through the image receiving module, and stores, in the storage means, the received images and the thumbnail images of the predetermined size corresponding to the received images. This makes it possible to easily select desired images from the images stored in the storage medium, and eliminates the necessity of generating thumbnail images corresponding to the captured images. Consequently, the desired images can be captured quickly and easily.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

This invention will be described in further detail by way of example with reference to the accompanying drawings.

Figure 2:
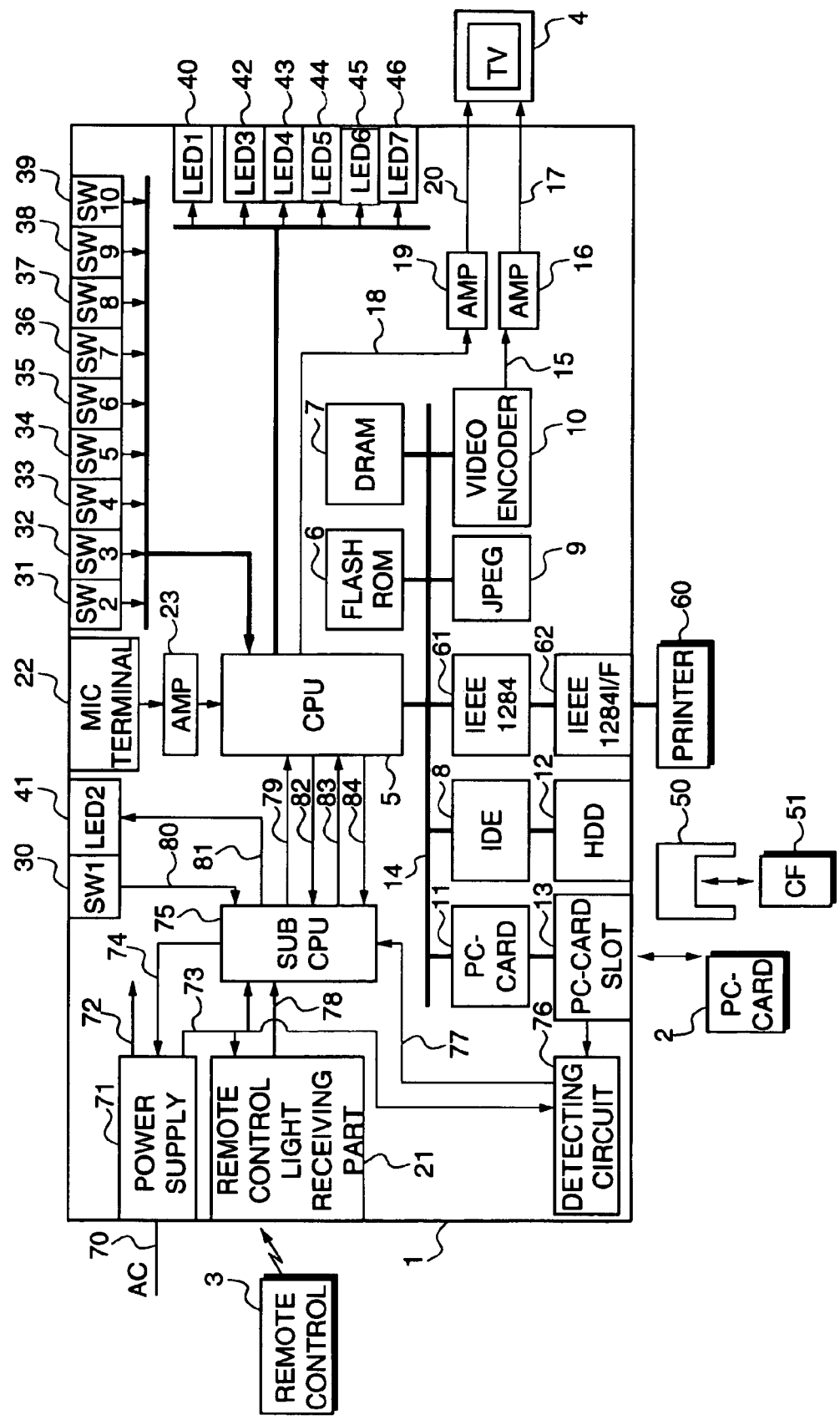
FIG. 2 is a block diagram showing the structure of an image storage apparatus according to a first embodiment of the present invention.

FIG. 2 is a block diagram showing the structure of an image storage apparatus according to a first embodiment of the present invention. In FIG. 2, reference numeral 1 denotes an image storage apparatus; 3, a remote control transmission machine for remotely operating the image storage apparatus 1; 4, a TV for displaying a taken image and receiving a UI (user's interface); 2, a PC card used as an electronic film of a digital camera; 51, a CF card as a small electric film; 50, a CF adapter for converting the CF card 51 into a PC card; and 60, a printer for printing an image and the like.

Reference numeral 5 denotes a CPU for controlling the image storage apparatus 1; 6, a program ROM of FLASH type containing a control program and display font data; 7, a DRAM for working the CPU 5; 13, a PC card slot into which an electronic film or the like wherein image data captured by a digital camera is recorded is inserted; 11, an IC for controlling the PC card; 12, a HDD for storing image data; 8, a circuit for controlling an IDE interface that is ordinarily used for the storage of the HDD and the like; 9, a JPEG chip for decoding JPEG-encoded image data and JPEG-encoding certain image data; 10, a video encoder IC for converting data displayed on a TV into TV signals; 15, an output signal from the video encoder IC 10; 16, an amplifier circuit for connecting to the TV; and 17, a video signal for connecting to the TV.

Reference numeral 22 denotes a microphone terminal for after-recording sounds, and signals from the microphone terminal 22 are inputted to the CPU 5 through an amplifier 23 and are quantized by an A/D converter in the CPU 5. To reproduce sounds, the CPU 5 outputs a signal 18 having already been converted from digital form to analog form, and the signal 18 can be listened to as an audio signal 20 through the TV 4.

Reference numeral 61 denotes an IEEE 1284 control circuit for controlling the printer 60, and 62 denotes an IEEE 1284 interface connector for connecting the printer 60 with the image storage apparatus 1. Reference numeral 71 denotes a power circuit, which supplies DC power required by the apparatus 1 from an AC power supply 70. The power circuit 71 has a line 73 for always supplying DC power and a line 72 for supplying DC power to the entire system through a built-in switching circuit. The power circuit 71 is turned on/off according to a signal 74.

Reference numeral 75 denotes a sub CPU, which works even when the apparatus 1 is on standby. The sub CPU 75 also activates the signal 74 for turning on the switching circuit of the power circuit 71 in order to activate the system when the sub CPU 75 receives a signal from the remote control transmission machine 3, when the PC card 2 or the CF card 51 mounted in the CF adapter 50 is inserted into the PC card slot 13, when a detection signal 77 from a detecting circuit 76 for detecting the insertion becomes active, or when a power switch 30 of the apparatus 1 is pressed. To carry out this activating process, the power circuit 71 always supplies a DC voltage 73 to the sub CPU 75, a remote control light receiving part 21 and the PC card insertion detecting circuit 76.

Reference numeral 83 denotes a signal for transmitting information indicative of whether the system is activated through the remote control transmission machine 3, the PC card slot 13 or the power switch 30, from the sub CPU 75 to the CPU 5. Reference numeral 82 denotes a reset signal that is transmitted from the CPU 5 to the sub CPU 75 for resetting the same. Reference numeral 84 denotes a communication permission signal indicating whether the CPU 5 is ready to receive a signal from the sub CPU 75.

The remote control light receiving part 21 is a module for converting a command signal from the remote control transmission machine 3 into an electric signal 78, and the sub CPU 75 demodulates the signal 78. The resulting demodulated signal 79 is transmitted to the CPU 5. The CPU 5 analyzes and executes the command.

Figure 1:
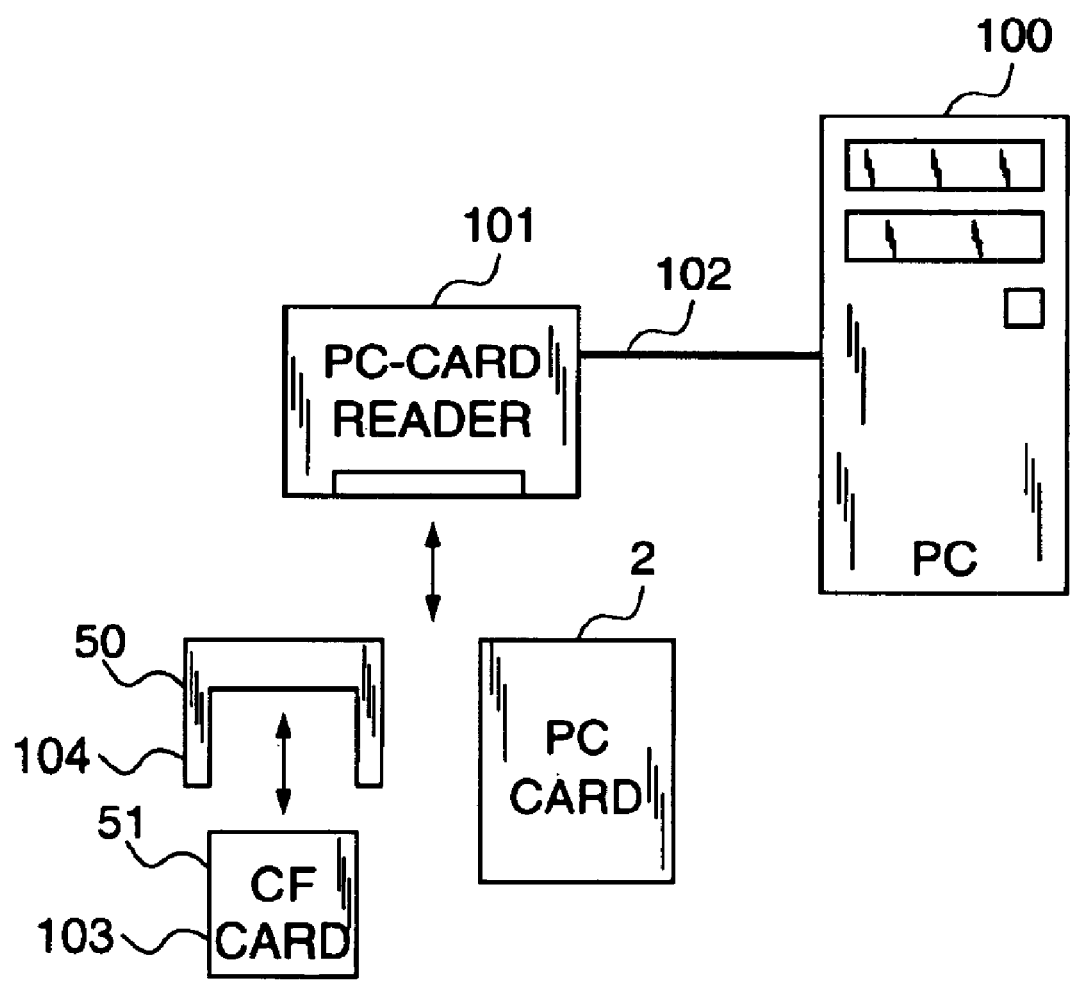
FIG. 1 is a view showing a conventional system in which a general purpose computer is used.
Figure 3:
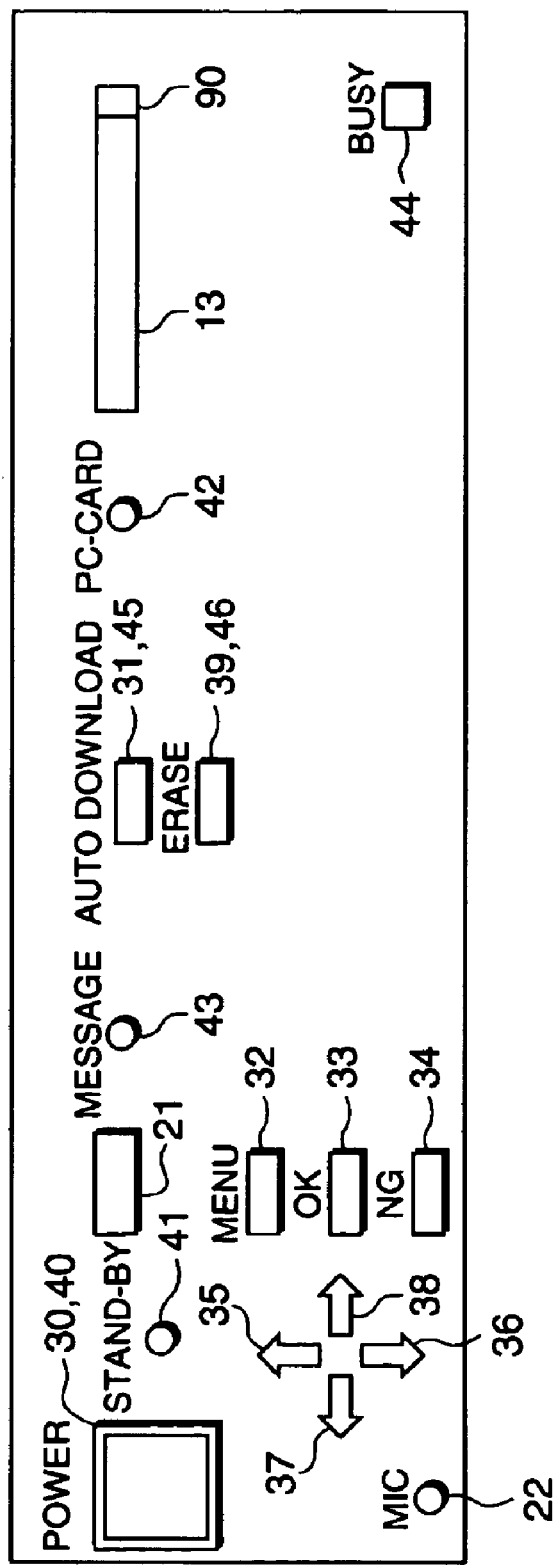
FIG. 3 is a view showing the arrangement of a control part of the image storage apparatus 1 in FIG. 2.

Reference numerals 30–39 denote control switches attached to a body of the image storage apparatus 1, and 40–46 denote LEDs attached to the image storage apparatus 1. These reference numerals correspond to numerals in FIG. 3. FIG. 3 shows a control part of the image storage apparatus 1 in FIG. 1.

Reference numeral 30 denotes a main power switch, and has a built-in LED 40 which is lighted when a main power is inputted. A signal 80 from the main power switch 30 enters the sub CPU 75 to thereby control the ON/OFF of the power in the entire system. The CPU 5 controls the LED 40. When the main power is off, the apparatus is on standby and a standby LED 41 is lighted under the control of the sub CPU 75. Reference numeral 31 denotes an automatic download switch for selecting a process of automatically downloading data from the PC card inserted into the PC card slot 13. The switch 31 has a built-in LED 45 for showing the processed state. Reference numeral 39 denotes an erase switch for selecting a process of erasing data from the PC card inserted into the PC card slot 13. The switch 39 has a built-in LED 46 for showing the processed state.

Reference numeral 90 denotes an eject switch for taking out the PC card 2 from the PC card slot 13, and 42 denotes an LED that is lighted when the PC card 2 is inserted into the PC card slot 13 and is flashed on and off when the PC card 2 is accessed for some processing.

Reference numeral 44 denotes an LED that is flashed on and off when the HDD as a built-in storage is accessed to. The image storage apparatus 1 receives the UI by operating the remote control transmission machine 3 with reference to the TV 4. The image storage apparatus 1, however, can execute the minimum processing without using the remote control transmission machine 3. Accordingly, there are provided switches 32–38 and an LED 43.

Reference numeral 32 denotes a switch for displaying a menu on the TV 4. To select a desired item from the menu, a cursor is moved by an arrow key switch. An upward switch 35 is pressed in order to move up the cursor, a downward switch 36 is pressed in order to move down the cursor, a left switch 37 is pressed in order to move the cursor to the left, and a right switch 38 is pressed in order to move the cursor to the right. When a frame of the item to which the cursor moves is highlighted, an OK switch 33 is pressed in order to execute the corresponding process. An NG switch 34 is pressed in order to cancel the process. If there is some error during the process, or if a user is required to execute some process, a message LED 43 is flashed on and off.

Switches equivalent to the switches 31–39 among the switches of the control part are provided in the remote control transmission machine 3. The switches of the remote control transmission machine 3 give the same commands as the switches 31–39.

Figure 4:
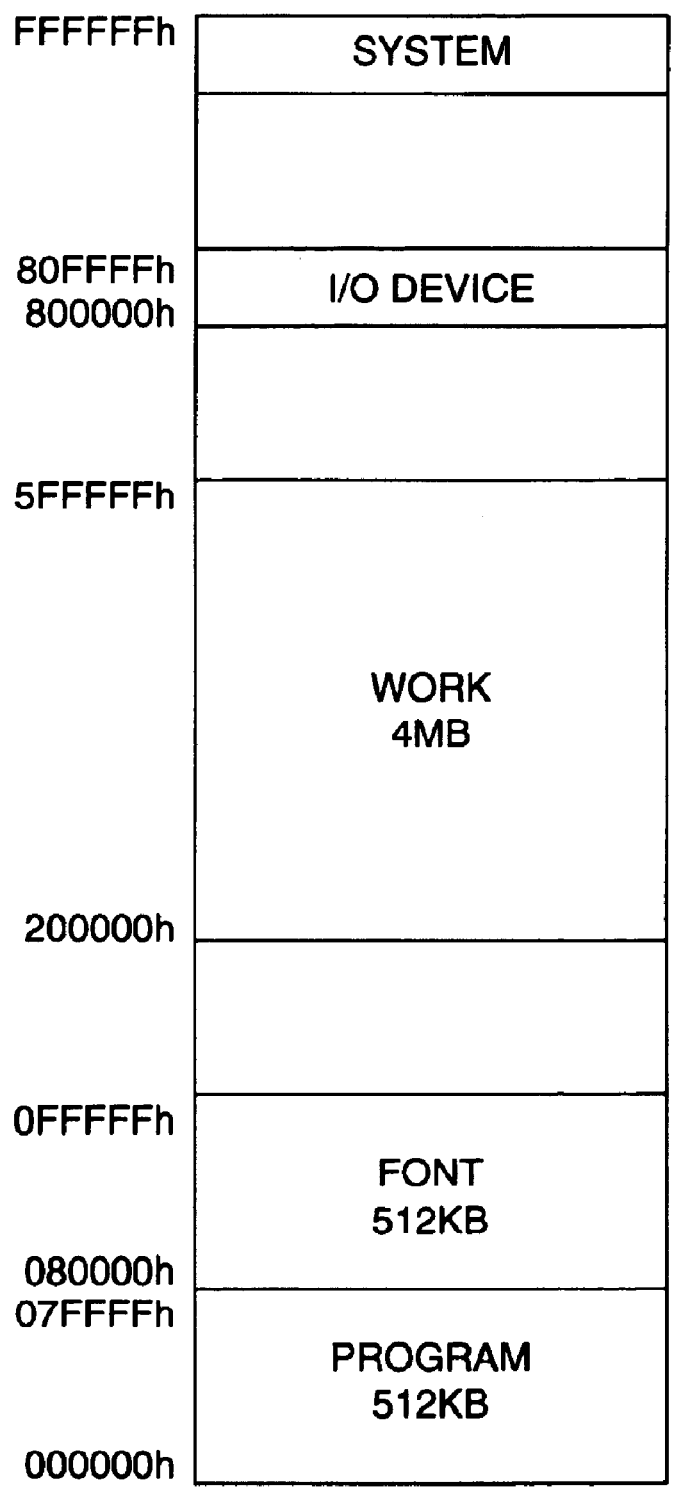
FIG. 4 is a view schematically showing a memory map of the image storage apparatus 1 in FIG. 2.

FIG. 4 shows a schematic memory map of the image storage apparatus 1 in FIG. 2.

As shown in FIG. 4, a program of the CPU 5 is stored in 000000h-07FFFFh, and display/printing font data is stored in 080000h-0FFFFFh. A work RAM for the CPU 5 is stored in 200000h-5FFFFFh, and is used as an data developing area during the JPEG decoding/encoding of image data or as a frame buffer for displaying image data on the TV 4. Although a detailed address is not explained, an I/O area is located in 800000h-80FFFFh.

A description will now be given of the downloading process.

There are many possible downloading conditions, and in the present embodiment, the following conditions are employed.

If a digital camera is used, the size of an image is 1024 (pixels)×768 (pixels), and the size of an uncompressed image file is about 2.5 MB. The size of the JPEG-encoded image file is about 200 KB. This digital camera uses a CF card of 15 MB, which contains about eighty images.

Figure 7:
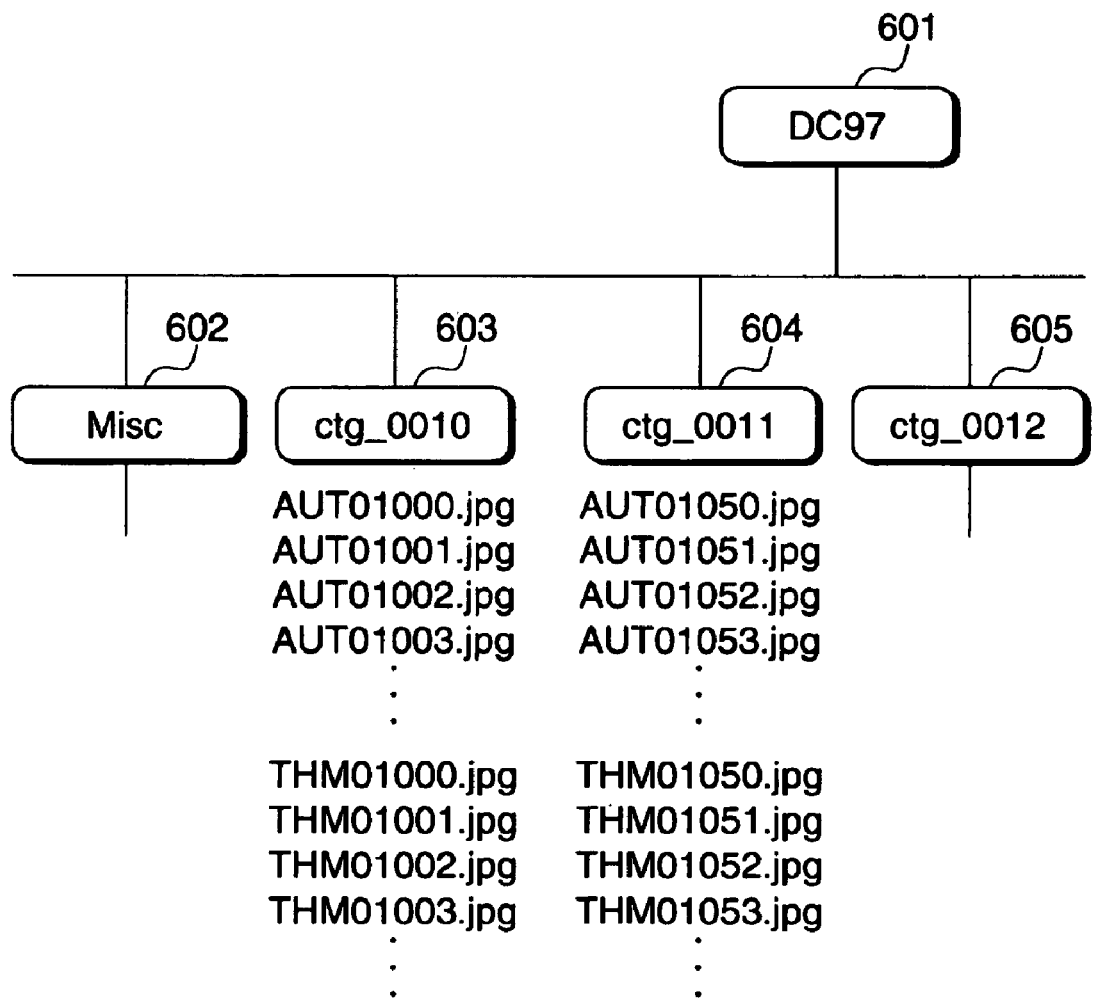
FIG. 7 is a view showing a directory structure in a CF card mounted in the image storage apparatus 1 in FIG. 2.
Figure 8:
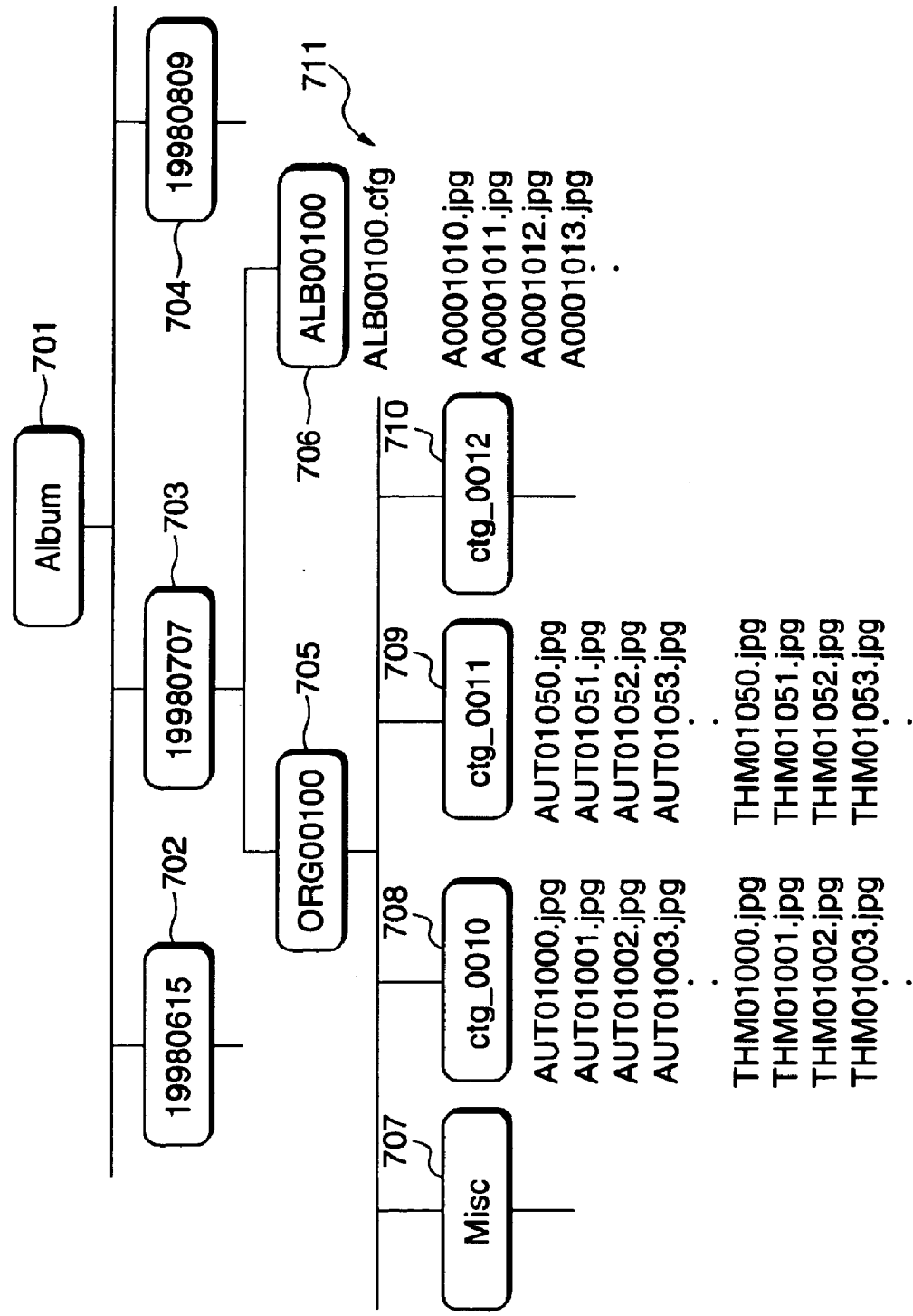
FIG. 8 is a view showing a directory structure in a HDD 12 of the image storage apparatus 1 in FIG. 2.

Referring first to FIGS. 2, 3, 7 and 8, there will be explained an automatic downloading process, which is executed only by operating switches at the body of the apparatus or switches of the remote control transmission machine 3. FIG. 7 shows a directory structure in the CF card mounted in the image storage apparatus in FIG. 2, and FIG. 8 shows a directory structure in the HDD 12 of the image storage apparatus 1 in FIG. 2.

If the CF adapter 50 on which the CF card 51 is mounted is inserted into the PC card slot 13 when the image storage apparatus 1 is on standby, the detection signal 77 from the PC card insertion detecting circuit 76 becomes active. The sub CPU 75 makes the signal 74 active to turn on the power supply of the system to activate the system. When the system is activated, the sub CPU 75 waits for the communication permission signal 84 of the CPU 5 to become active. The sub CPU 75 posts information indicating that the system is activated by the insertion of the CF card 51 into the PC card slot 13 to the CPU 5 through the signal 83. Then, the sub CPU 75 lights the LED 42, and waits for a next instruction from the user.

When the automatic download switch 31 (or a switch of the remote control transmission machine 3, which is equivalent to the switch 31) is pressed in the above state, the LED 45 in the switch 31 is lighted. When the OK switch is pressed next, the automatic downloading process is started. During the process, the LED 45 flashes on and off. Upon completion of the process, the LED 45 stops flashing on and off, and is only lighted. When the data in the CF card 51 and the HDD 12 are accessed, the respective corresponding LEDs flash on and off. In the automatic downloading process, the data beginning from a directory name DC97 (601) existing in a route produced by the digital camera as shown in FIG. 7 are downloaded into the image storage apparatus 1.

In the HDD 12 into which the data is downloaded, a directory, e.g., 198070707 (703) is generated under a directory Album (701) according to the date of downloading in a route as shown in FIG. 8. A directory for collectively containing the downloaded original data, e.g., ORG00100 (7-5) is generated under the directory 98070700. The data in the PC card 51 is stored with its original directory structure under the directory ORG00100 (7-5). The time required for the downloading is determined by a speed at which the data is read from the PC card slot 13. It takes about 30 seconds to store the data since the reading speed is about 600 KB/sec.

To erase the data in the CF card 51 in this state, the erase switch 39 is pressed. This lights the LED 46 in the switch 39. When the OK switch 33 is pressed in this state, the erasure is started and the LED 46 flashes on and off. On completion of the process, the LED 46 finishes flashing on and off and is only lighted. Consequently, the directories and files beginning from DC 97 are erased. It takes about 50 seconds to erase them since the writing speed is about 300 KB/sec. If the PC card eject switch 90 is pressed, the CF adapter 50 in which the CF card 51 is mounted can be ejected from the PC card slot 13. If there is another PC card 51 from which the data need to be downloaded, the above operation is repeated. If the power switch 30 is pressed on completion of the downloading, the system is brought into the standby state.

Figure 9:
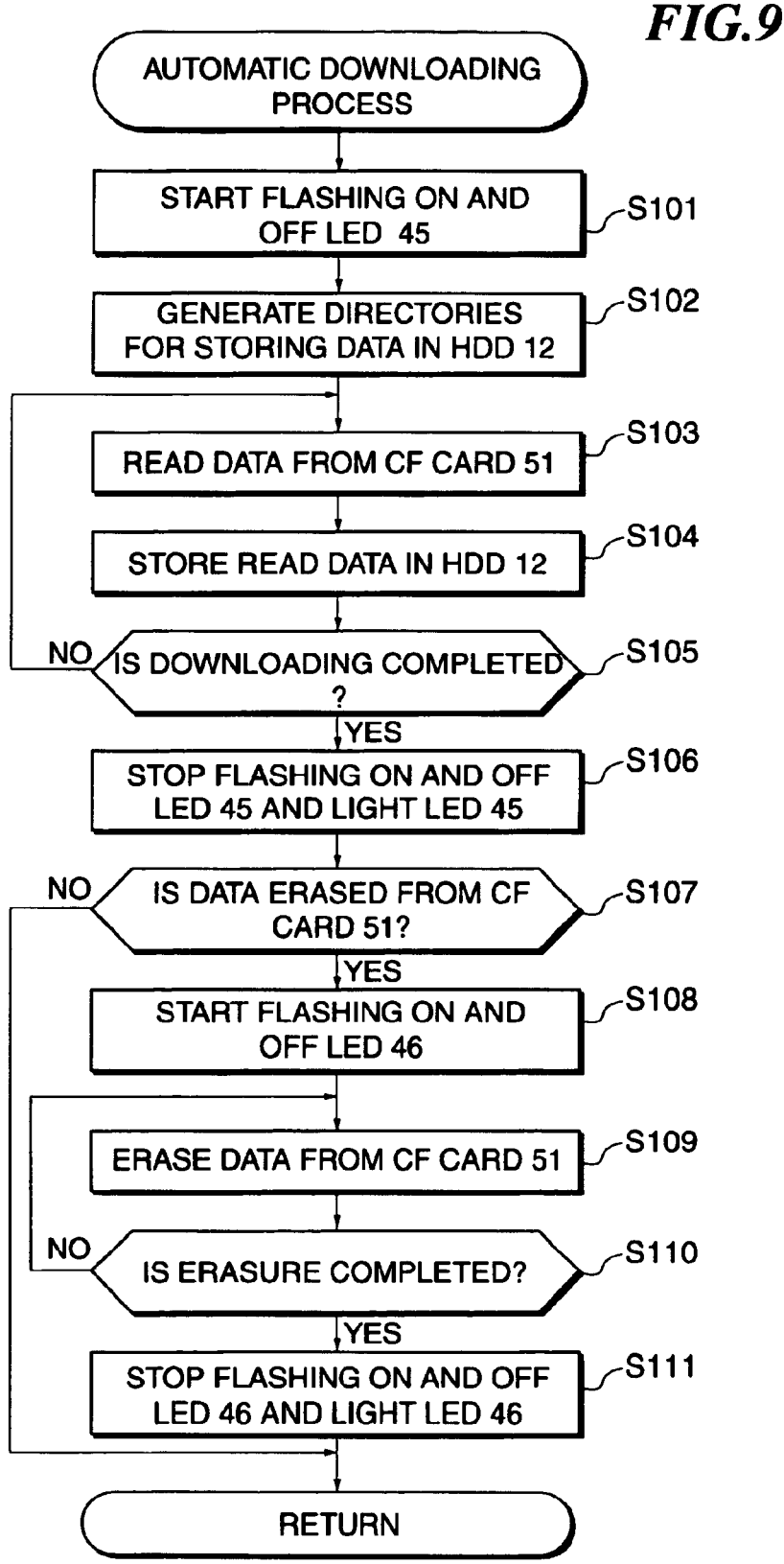
FIG. 9 is a flow chart showing the procedure of an automatic downloading process executed by the image storage apparatus 1 in FIG. 2.

Referring next to FIG. 9, a detailed description will now be given of the procedure for the automatic downloading process. FIG. 9 is a flow chart showing the procedure for the automatic downloading process executed by the image storage apparatus 1 in FIG. 2.

At the start of the automatic downloading process, the LED 45 starts flashing on and off in a step S101, and generates a directory for containing the data in the HDD 12 as shown in FIG. 9. Then, the process goes to a step S103 to read the data (the directory name DC97 in the route produced by the digital camera as shown in FIG. 7). In a next step S104, the read data is stored in the directory in the HDD 12. In a step S105, whether the downloading is completed or not is determined. If the downloading is incomplete, the process returns to the step S103 to read and store the data. If the downloading is completed, the process goes to a step S106.

In the step S106, the LED 45 is caused to stop flashing on and off upon completion of the downloading, and the LED 45 is only lighted. Then, the process goes to a step S107 to determine whether there is an instruction to erase the data in the CF card 51 by the depression of the erase switch 39. If there is no instruction to erase the data in the CF card 51, the process is finished. If there is an instruction to erase the data in the CF card 51, the process goes to a step S108 to start flashing on and off the LED 46. In a next step S109, the data in the CF card 51 is erased. In a step S110, whether the data erasing process is completed or not is determined. If the data erasing process is incomplete, the process returns to the step S109 to continue the data erasing process. If the data erasing process is completed, the process goes to a step S111 to stop flashing on and off the LED 46, and light the LED 46. Then, the process is finished.

In the automatic downloading process explained above, the image in the CF card 51 is only captured and stored in the HDD 12. In this process, a thumbnail image corresponding to the captured image is not generated.

Referring next to FIGS. 2, 4, 6A–6E, 7 and 8, there will be explained the case where the system is activated by a process other than the automatic downloading after the automatic downloading process is executed. FIGS. 6A–6E show a user's interface screen on a TV screen when an image file is processed into an album after the downloading is completed by the image storage system in FIG. 2.

Figure 6A:
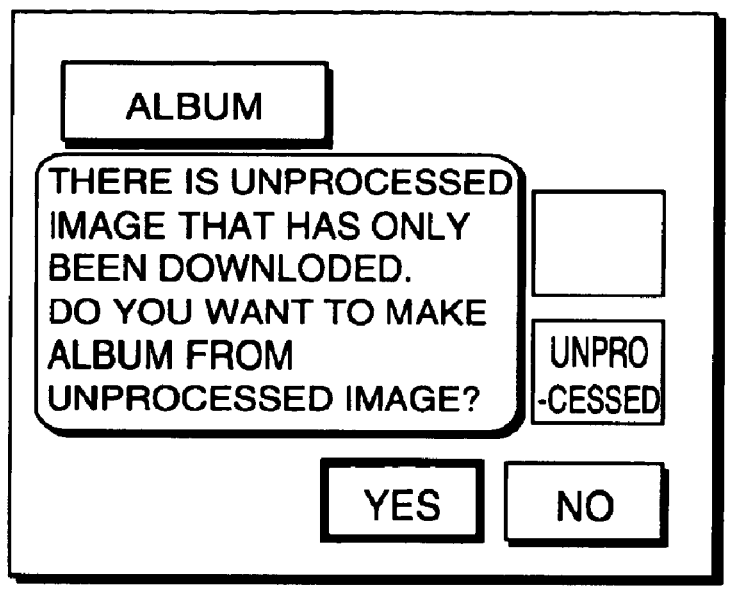
FIG. 6A is a view showing an example of the album list mode screen which displays a message urging to make an album during an album making process executed by the image storage apparatus 1 in FIG. 2.
Figure 6B:
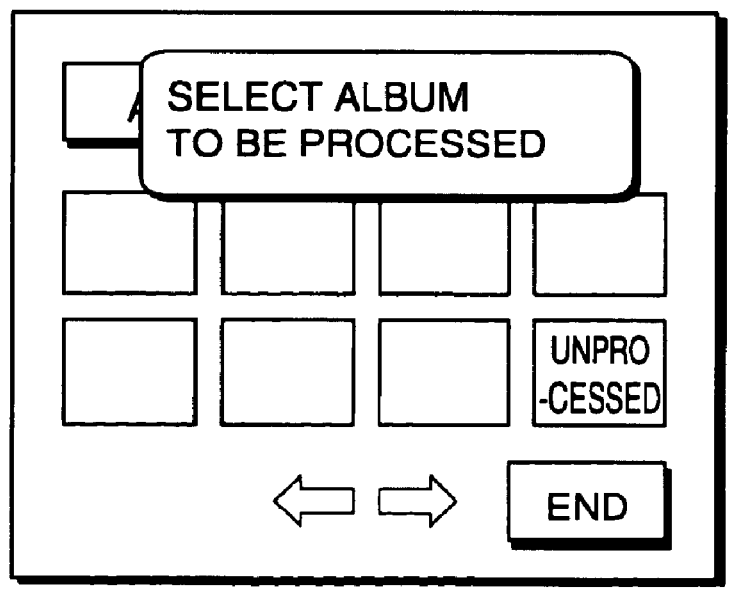
FIG. 6B is a view showing the album list mode screen for selecting an image file to be processed into an album during the album making process executed by the image storage apparatus 1 in FIG. 2.
Figure 6C:
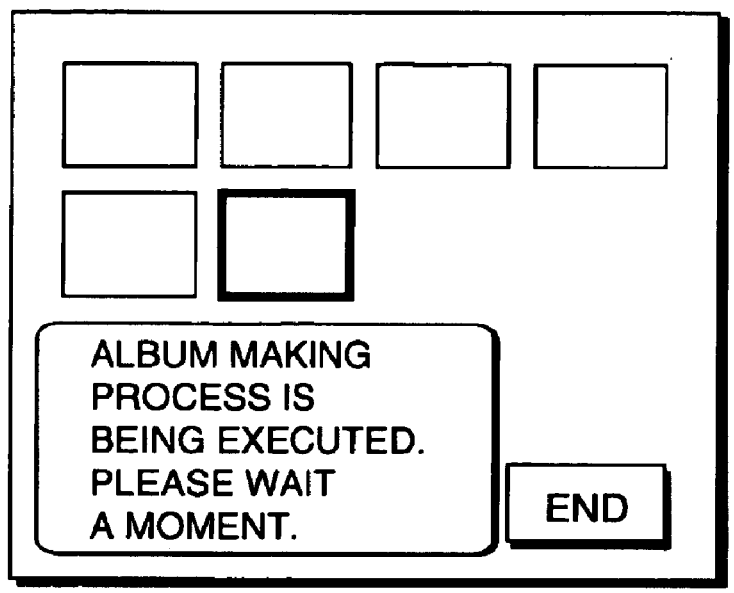
FIG. 6C is a view showing an example of the album list mode screen during the album making process executed by the image storage apparatus 1 in FIG. 2.
Figure 6D:
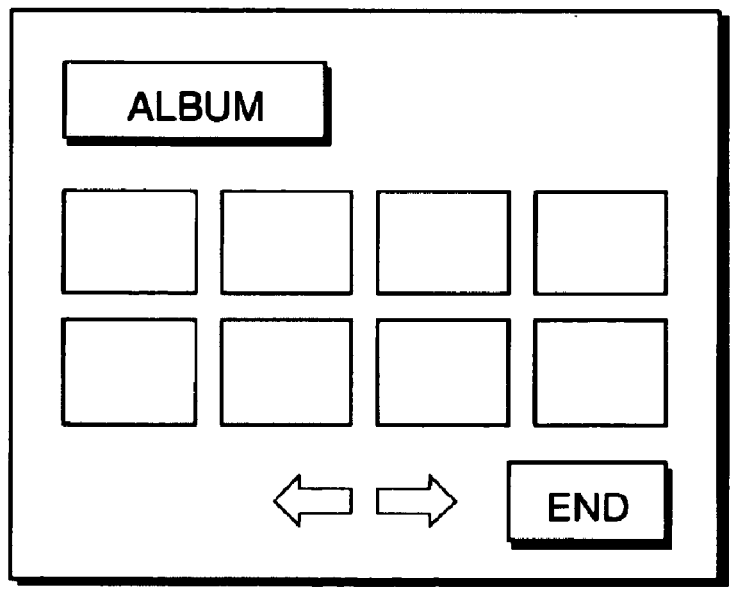
FIG. 6D is a view showing an example of the album list mode screen after the album making process executed by the image storage apparatus 1 in FIG. 2.

When the system is activated, an album list mode is ordinarily executed as an initial mode as shown in FIG. 6D. If there is an image file which has not yet been processed into an album, a message urging to process the image file into the album is displayed on the TV 4 as shown in FIG. 6A. To process an unprocessed image file into an album, an item "yes" is highlighted on the screen by operating the remote control transmission machine 3, and then an execution key of the remote control transmission machine 3 is pressed. Consequently, a process of making the album from the image is selected. In the process of producing the album from the image file, management thumbnail images for managing original images are generated and stored in a directory -706 other than the directory 705 containing the original images in FIG. 8. There is a limitation to the number of image files in one directory in the digital camera, and thus, the image files are divided into, e.g., subdirectories 603, 604, 605 in FIG. 7. When the image files are processed into an album, thumbnail images corresponding to the image data in the subdirectories are compressed into a directory 706 (FIG. 8) for an album. A file 711 (FIG. 8) is also generated for managing the directory 706.

If the process of making the album from the image file is selected, a screen for selecting an album to be processed is displayed, as shown in FIG. 6B, and a message urging the selection of an image file to be processed is displayed on this screen. On this screen, a word "unprocessed" is put on an icon indicating an unprocessed image file. To select the icon with the word "unprocessed", the upward, downward, right and left keys of the remote control transmission machine 3 are pressed to highlight an icon of an image file to be processed into an album. Then, the execution key of the remote control transmission machine 3 is pressed. Consequently, the process of making the selected album is started. During the process, a message indicating that the process is being executed is displayed on the screen of the TV 4 as shown in FIG. 6C. On completion of the process, the album list mode as shown in FIG. 6D is started, so that the user can select a desired album and see the images.

A description will now be given of the process of making the album from the image file.

The CPU 5 reads the JPEG-encoded original image data beginning from the directory 705 in FIG. 8 containing the original image data of the HDD 12, and decodes the original image data through the JPEG chip 9. The CPU 6 stores the results of the decoding in the DRAM 7, and resizes the data in order to generate a thumbnail image (60 pixels×80 pixels) for the album. The generated thumbnail image is JPEG-encoded through the JPEG chip 9, and is stored as the album thumbnail image in a directory 707 in FIG. 8. This process is repeated for the whole image data existing in the directories beginning from the directory 705 in FIG. 8. Then, a representative image, normally a first image is displayed as a representative image for each album in the album list mode. During the process of making the album, the generated thumbnail images are sequentially displayed as shown in FIG. 6C. On completion of the process, the screen is switched to an album list mode screen as shown in FIG. 6D.

The time required for executing the above process consists of the following
1) the time for reading the original image data from the HDD 12
2) the time for decoding the data through the JPEG chip 9
3) the time for resizing the data in order to generate the thumbnail image 4) the time for JPEG-encoding the thumbnail image.

The time for resizing the data makes up the most part of the time required for executing the whole process.

In the case of the image storage apparatus 1 of the present embodiment, the time required for executing the above process is as follows:
1) the time for reading the original image data from the HDD 12: 0.04 second per image—about 3 seconds as a whole
2) the time for decoding the data through the JPEG chip 9: 0.1 second per image—about 8 seconds as a whole.

The processing capacity is 30 fps in the case of a VGA size (640 pixels×480 pixels), and thus, the processing capacity is about 10 fps if the image size is 1024 pixels×768 pixels.
3) the time for resizing the data in order to generate the thumbnail image: 0.6 seconds per image-about 48 seconds as a whole
4) the time for JPEG-encoding the thumbnail image: such a short time as to be ignored.

Therefore, it takes about sixty seconds to complete the process.

Figure 12:
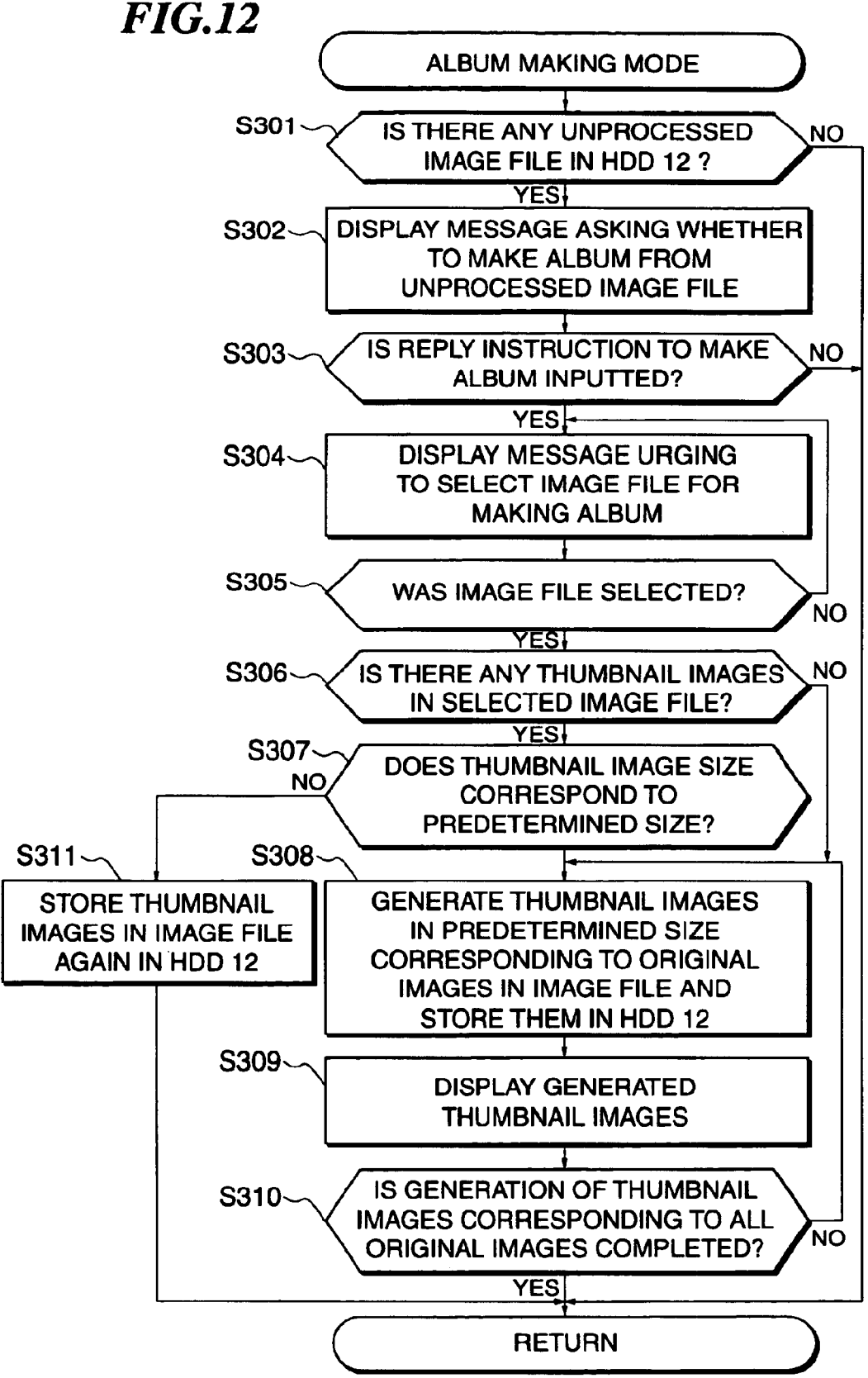
FIG. 12 is a flow chart showing the procedure for making an album by the image storage apparatus 1 in FIG. 1.

Referring next to FIG. 12, a detailed description will be given of the process of making the album. FIG. 12 is a flowchart showing the procedure for making the album by the image storage apparatus 1 in FIG. 2.

As shown in FIG. 12, it is determined first in a step S301 whether there is any unprocessed image file (an image file which has not yet been processed into an album) in the HDD 12. If there is no unprocessed image file, the process is finished. If there is any unprocessed image file, the process goes to a step S302 to display a message asking whether to process the unprocessed image file into the album (see FIG. 6A). In a step S303, it is determined whether a reply instructing the unprocessed image to be processed into the album is inputted or not. If there is no such reply, the process is finished. If the reply is inputted, the process goes to a step S304.

In the step S304, a message urging the selection of an image file to be processed into the album is displayed (see FIG. 6B). In a next step S305, it is determined whether the image file to be processed into the album has been selected or not. If the image file has not been selected, the process returns to the step S304 to wait for the image file to be selected. If the image file has been selected, the process goes to a step S306 to determine whether there is a thumbnail image in the selected image file (e.g., a case where three letters from the top of a file name of a file THM01000.jpg under a directory 708 in FIG. 8 are THM). If there is the thumbnail image, the process goes to a step S307. In the step S307, it is determined whether the size of the thumbnail image in the selected image file corresponds to a predetermined size. The predetermiend size means the size of the thumbnail image used in the image storage apparatus 1. If the size of the thumbnail image in the selected image file does not correspond to the predetermined size, the process goes to a step S308. If it is determined in the step S306 that there is no thumbnail image in the selected image file, the process also goes to the step S308.

In the step S308, a thumbnail image of the predetermined size corresponding to the original image in the image file is generated, and the generated thumbnail image is JPEG-encoded through the JPEG chip 9 and is stored in the HDD 12. In a next step S309, the generated thumbnail image is displayed, and a message indicating that the image file is being processed into the album is displayed (see FIG. 6C). Then, the process goes to a step S310 to determine whether the generation of the thumbnail images corresponding to all the original images in the selected image file is completed or not. If the generation of the thumbnail images corresponding to all the original images is not completed, the process returns to the step S308 to generate, store and display a next thumbnail image. When the generation of the thumbnail images corresponding to all the original images is completed, the process is finished.

When it is determined in the step S307 that the size of the thumbnail image in the selected image file corresponds to the predetermined size, the process goes to a step S311. In the step S311, the thumbnail image in the selected image file is stored again as an image management thumbnail image in the HDD 12.

On completion of the album making process, the screen is switched to the album list mode screen in FIG. 6D as stated above.

Referring next to FIGS. 2, 3, 4, 5, 7 and 8, there will be explained the case where the images in the CF card 51 are selected and downloaded with reference to the TV 4. FIGS. 5A–5E show a user's interface screen in the case where the images are downloaded with reference to the screen of the TV 4 connected to the image storage apparatus 1 in FIG. 2.

When the CF adapter 50 in which the CF card 51 is mounted is inserted into the PC card slot 13 in a mode wherein the images in the album are looked at in the image storage apparatus 1, the detection signal 77 from the PC card insertion detecting circuit 76 becomes active, and the sub CPU 75 posts the signal 83 indicating the insertion of the PC card into the PC card slot 13, to the CPU 5. Then, the CPU 5 lights the PC card LED 42, and shifts the mode to a PC card display mode.

Figure 5A:
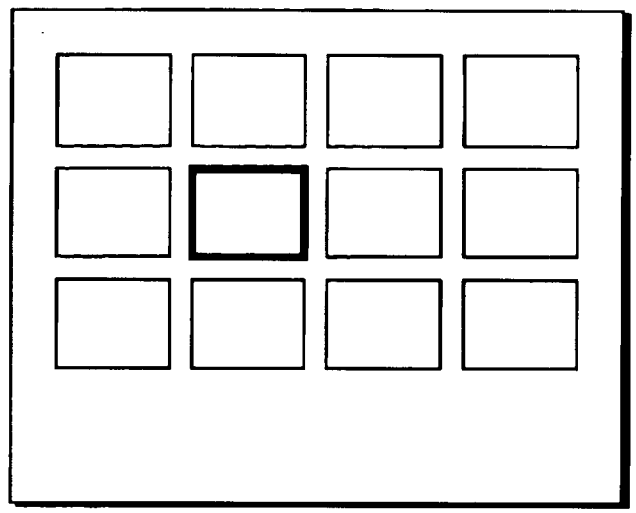
FIG. 5A is a view showing an example of a screen in a thumbnail image list mode in the case where images are downloaded with reference to a TV screen, which is a display part of the image storage apparatus 1 in FIG. 2.

In the PC card display mode, thumbnail images corresponding to the JPEG-encoded images under the directory DC97 in the route in FIG. 7 are sequentially generated from the PC card inserted into the PC card slot 13. The generated thumbnail images are sequentially displayed on the TV 4 in a thumbnail image list mode as shown in FIG. 5A. If there are thumbnail images of a predetermined size corresponding to the images under the directory DC 97, those thumbnail images are read and sequentially displayed on the TV 4 in the thumbnail image list mode. When the processing of the whole image data is completed, a desired page can be displayed by operating the remote control transmission machine 3. A desired image can be selected and displayed in a large size on the TV 4, or a slide show in which multiple images are sequentially displayed can be enjoyed.

Figure 5B:
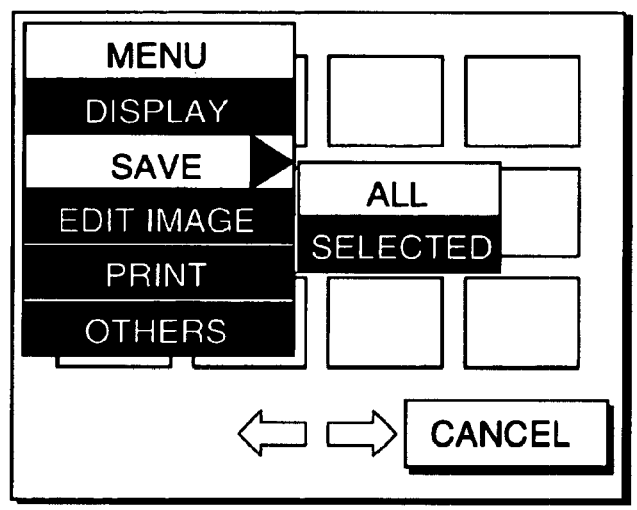
FIG. 5B is a view showing an example of a screen in the case where thumbnail images are selected in the thumbnail image list mode.

If an item "SAVE" is selected from the menu by operating the remote control transmission machine 3 as shown in FIG. 5B, a sub menu is displayed. According to the sub menu, it is possible to determine whether to save or store all the images or select and store some images.

Figure 5C:
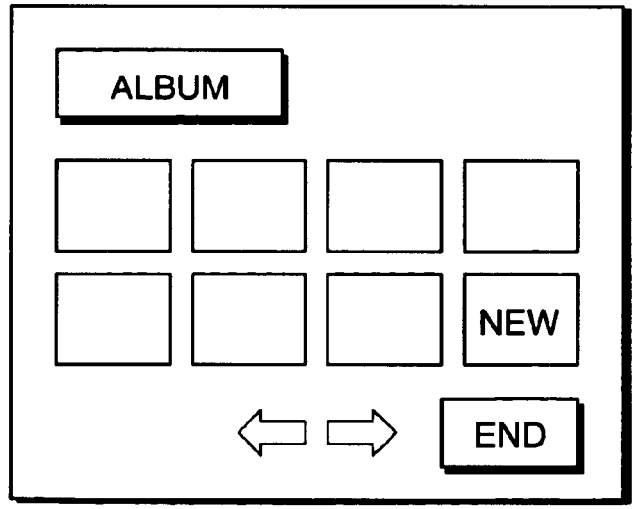
FIG. 5C is a view showing an example of an album list mode screen which is switched from the thumbnail image list mode screen.

If it is determined that all the images are to be stored, the screen of the album list mode in FIG. 5C is displayed in order to determine which album will contain those images. An icon of an album in which the selected images are to be stored is selected from a plurality of icons of albums including a new album by operating the remote control transmission machine 3. The selected album icon is highlighted, and is fixed by pressing the execution button of the remote control transmission machine 3. Then, the storage of the images in the selected album is started. If an existing album is selected, the images are added and stored at the last of the album. If a new album is selected, the images are sequentially stored in the new album from the first image.

Figure 5D:
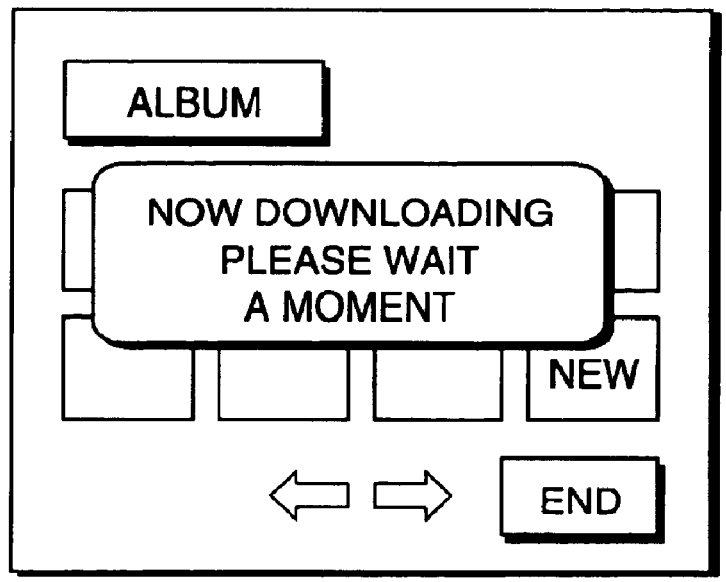
FIG. 5D is a view showing an example of the album list mode screen during downloading.
Figure 5E:
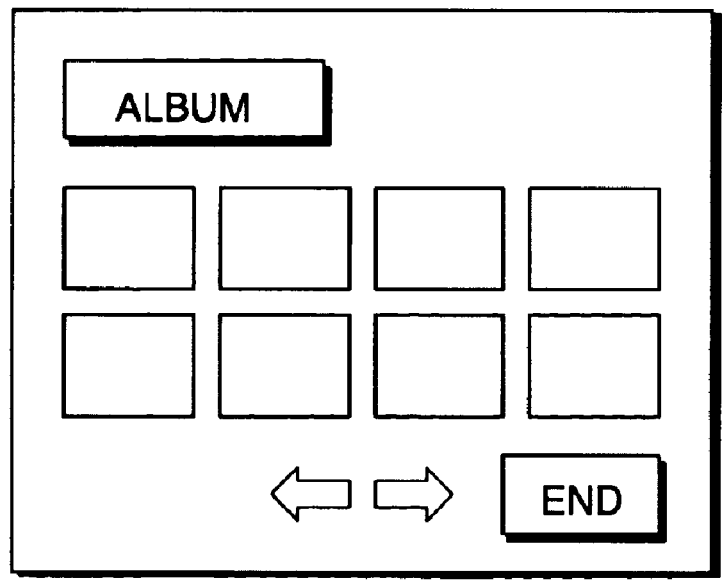
FIG. 5E is a view showing an example of the album list mode screen after downloading.

A description will now be given of the storage process by way of an example wherein the new album is selected. First, the selected images are sequentially read from the PC card 51 and are captured into the image storage apparatus 1. During the downloading, a message indicating that the images are being downloaded is displayed on the screen, as shown in FIG. 5D. On completion of the downloading, a thumbnail image corresponding to the first image stored in the new album is displayed in an icon area of the new album as shown in FIG. 5E. In this case, the screen of the album list mode is displayed.

The time required for the above processing consists of the time required for displaying a list of thumbnail images for all the images in the CF card 51 and the time required for storing the thumbnail images in the HDD 12.

First, the time required for displaying the thumbnail images corresponding to the images in the CF card 51 consists of the following:

1) the time for reading the images from the CF card 51: 0.4 second per image-about 26 seconds as a whole
2) the time for decoding the images through the JPEG 9: 0.1 second per image-about 8 seconds as a whole
3) the time for resizing the images: 0.6 second per image-about 48 seconds as a whole.

It takes about 80 seconds to execute the whole process in the case where the thumbnail images of the predetermined size are generated again. If the thumbnail images of the predetermined size are stored in the CF card 51, they have only to be read and displayed. Thus, there is no necessity of generating thumbnail images, and this further reduces the processing time.

The time for accessing to the HDD 12 makes up the most part of the time for accessing to the HDD 12, i.e., storing the images in the HDD 12 and reading them from the latter if necessary files are stored in a temporary file of the HDD 12 at the same time with the display of the CF card. It takes about three seconds to read the temporary file and it takes about three seconds to write the temporary file as an album file. Therefore, it takes about six seconds to complete the process.

In the above description, all the images are selected and stored in the new album. If, however, some images are selected, they can be stored in the new album or the existing album by selecting desired images from the list of thumbnail images by operating the remote control transmission machine 3.

Figure 10:
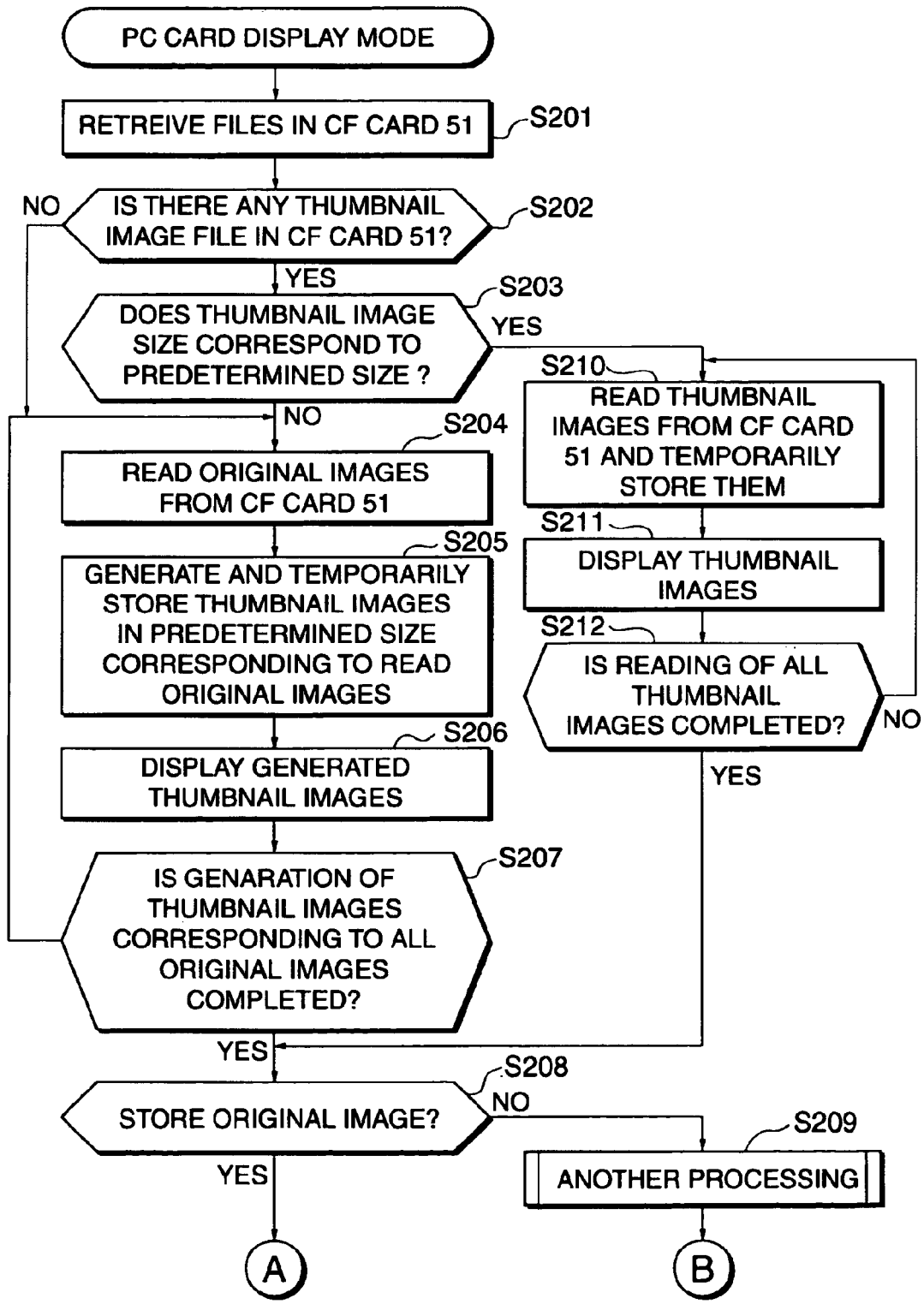
FIG. 10 is a flow chart showing the procedure in a PC card display mode of the image storage apparatus 1 in FIG. 2.
Figure 11:
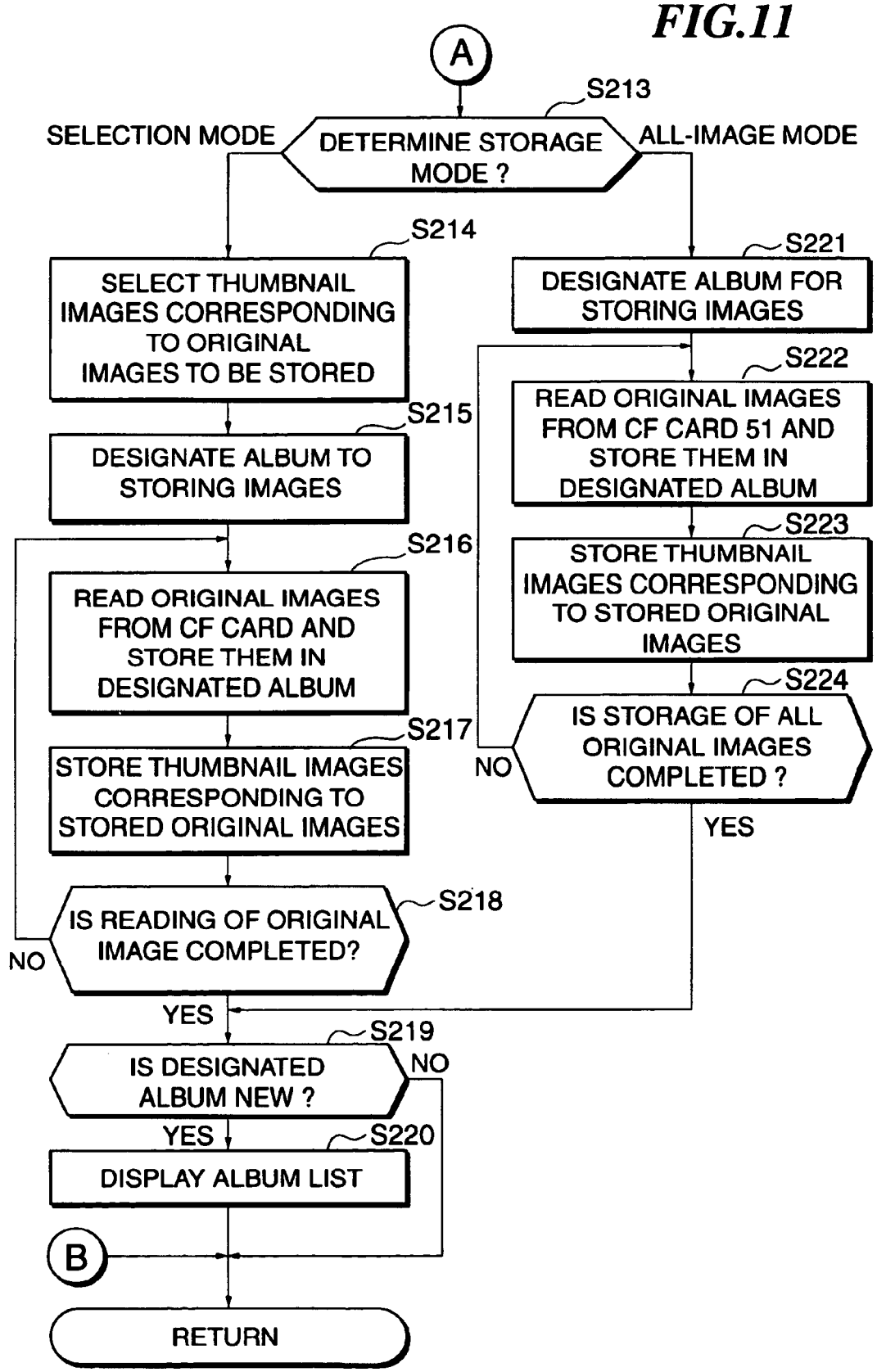
FIG. 11 is a flow chart showing the procedure continued from FIG. 10 in the PC card display mode.

Referring next to FIGS. 10 and 11, there will be explained the procedure in the PC card display mode. FIG. 10 is a flow chart showing the procedure in the PC card display mode in the image storage apparatus 1 in FIG. 2, and FIG. 11 is a flow chart showing the procedure continued from FIG. 10.

In the PC card display mode, the files in the CF card 51 are retrieved in a step S201 as shown in FIG. 10, and whether there is any file of thumbnail images in the CF card or not is determined according to the results of the retrieval in a next step S202. If there is no file of thumbnail images, it is determined that the thumbnail images should be generated, and the process goes to a step S204. If there is a file of thumbnail images, the process goes to a step S203. In the step S203, it is determined whether the size of the thumbnail images corresponds to the predetermined size. If the size of the thumbnail images does not correspond to the predetermined size, it is determined that the thumbnail images will be generated. The process goes to a step S204.

In the step S204, the original images are read from the CF card 51, and in a next step S205, the thumbnail images of the prdetermined size are generated correspondingly to the read images. The generated thumbnail images are stored in the temporary file of the HDD 12. Then, the process goes to a step S206 to display the generated thumbnail images on the TV 4. Then, the process goes to a step S207 to determine whether the generation of the thumbnail images corresponding to all the original images in the CF card 51 is completed or not. If the generation of the thumbnail images is incomplete, the process returns to the step S204 to read the next original image from the CF card 51 and generate and display the thumbnail image. On the other hand, if the generation of the original images is completed, the process goes to a step S208 to determine whether or not the storage of the original images in the CF card 51 is selected on the screen in FIG. 5B. If the storage of the original images is not selected, it is determined that another processing is selected. Then, the process goes to a step S209 to execute another processing and complete the process (see FIG. 11). If the storage of the original images is selected, the process goes to a step S213 in FIG. 11.

If it is determined in the step S203 that the size of the thumbnail images in the CF card 51 corresponds to the predetermined size, it is determined that the thumbnail images in the CF card 51 can be used as management thumbnail images for the image storage apparatus 1. Then, the process goes to a step S210. In the step S210, the thumbnail images are read from the CF card 51 and are stored in the temporary file of the HDD 12. In a next step S211, the thumbnail images are displayed. Then, the process goes to a step S212 to determine whether the reading of all the thumbnail images is completed or not. If the reading is incomplete, the process returns to the step S210 to read, store and display the next thumbnail image. If the reading is completed, the process goes to the step S208 to determine whether or not the storage of the original images in the PC card 51 is selected on the screen as shown in FIG. 5B. If the storage of the original images is not selected, it is determined that another processing is selected. Then, the process goes to the step S209 to execute another processing and finish the process (see FIG. 11). If the storage of the original images is selected, the process goes to a step S213 in FIG. 11.

In the step S213, it is determined whether the storage mode is a selection mode or an all-image mode. If the storage mode is the selection mode, the process goes to a step S214 to select images by selecting the corresponding thumbnail images on the screen in FIG. 5B. In a next step S215, the album for containing the images is designated. Then, the process goes to a step S216 to read the selected images from the CF card 51 and store the read images in the designated album. In a next step S217, thumbnail images corresponding to the stored original images are read from the temporary file and are stored in a different directory from the album directory. Then, the process goes to a step S218 to determine whether the storage of all the selected original images is completed or not. If the storage of all the selected images is incomplete, the process returns to the step S216 to read and store the next original image and read and store the thumbnail image. On the other hand, if the storage of all the selected images is completed, the process goes to a step S219 to determine whether the album for storing the read images is a new album or not. If the album for storing the read images is a new album, the process goes to a step S220 to change the icon of the new album to an icon of a thumbnail image at the top of the album within the same display area. Then, the process is finished. If the album for storing the read images is not a new album, the step S220 is skipped to finish the process.

If it is determined in the step S213 that the storage mode is the all-image mode, it is determined that all the images are selected. Then, the process goes to a step S221 to designate an album for storing the images. Then, the process goes to a step S222 to read the original images from the CF card 51 and store the read original images in the designated album. In a next step S223, thumbnail images corresponding to the read original images are read from the temporary file and are stored in a different directory from the album directory. Then, the process goes to a step S224 to determine whether the storage of all the original images is completed or not. If the storage of all the original images is incomplete, the process returns to the step S222 to read and store the next original image and read and store the thumbnail image. On the other hand, if the storage of all the original images is completed, the process goes to a step S219 to determine whether the album for containing the read images is a new album or not. If the album for containing the read images is a new album, the process goes to a step S220 to change an icon of the new album to an icon of a thumbnail image at the top of the album within the same display area. Then, the process is finished. If the album for containing the read images is not a new album, the step S220 is skipped to finish the process.

According to the present embodiment, it is possible to select the automatic downloading or the downloading in order to download the data from the CF card 51 as the electronic film containing the image data taken by the digital camera and the like into the HDD 12 built in the image storage apparatus 1. If the automatic downloading is selected, the images can only be downloaded from the CF card 51 (i.e., the electronic film) without generating the thumbnail images. In other words, there is no necessity of resizing the images (i.e., the thumbnail image generating process), which consumes the longest time in the album making process using the original images. Thus, the images can be downloaded quickly from the CF card 51 as the electronic film, and the CF card 51 can be used as a new electronic film in the digital camera. The larger the storage capacity of the CF card 51 and the larger the number of images to be downloaded, the larger the effect of reducing the processing time required for the downloading is.

If a thumbnail image file (having a name whose three letters from the top is THM such as THM01000.jpg) in the files downloaded as the original images under the directory 708 in FIG. 8 corresponds to a predermined size of the thumbnail image generated during the album making process, the thumbnail image file in the downloaded files is copied as an album managing thumbnail image. This eliminates the necessity of resizing the images (e.g., the thumbnail image generating process), which consumes the longest time in the album making process using the original images, and reduces the time required for the album making process.

Further, in the PC card display mode wherein the PC card adapter 50 in which the CF card 51 is mounted is inserted into the slot of the PC card I/F 13 to display the original image data in the CF card 51 on the TV 4, it is determined whether the CF card 51 contains a thumbnail image in the same size as the thumbnail image used in the image storage apparatus 1. If yes, the thumbnail image in the CF card 51 is read and displayed on the TV 4. This eliminates the necessity of generating the thumbnail image to be displayed on the TV 4, and reduces the time required for displaying the image. If an image to be downloaded is selected using the thumbnail image displayed in the PC card display mode, the thumbnail image displayed on the TV 4 can be used as a thumbnail image for the downloaded image. This eliminates the necessity of generating the thumbnail image for the downloaded image, and reduces the time required for storing the downloaded image.

(Second Embodiment)

Figure 13:
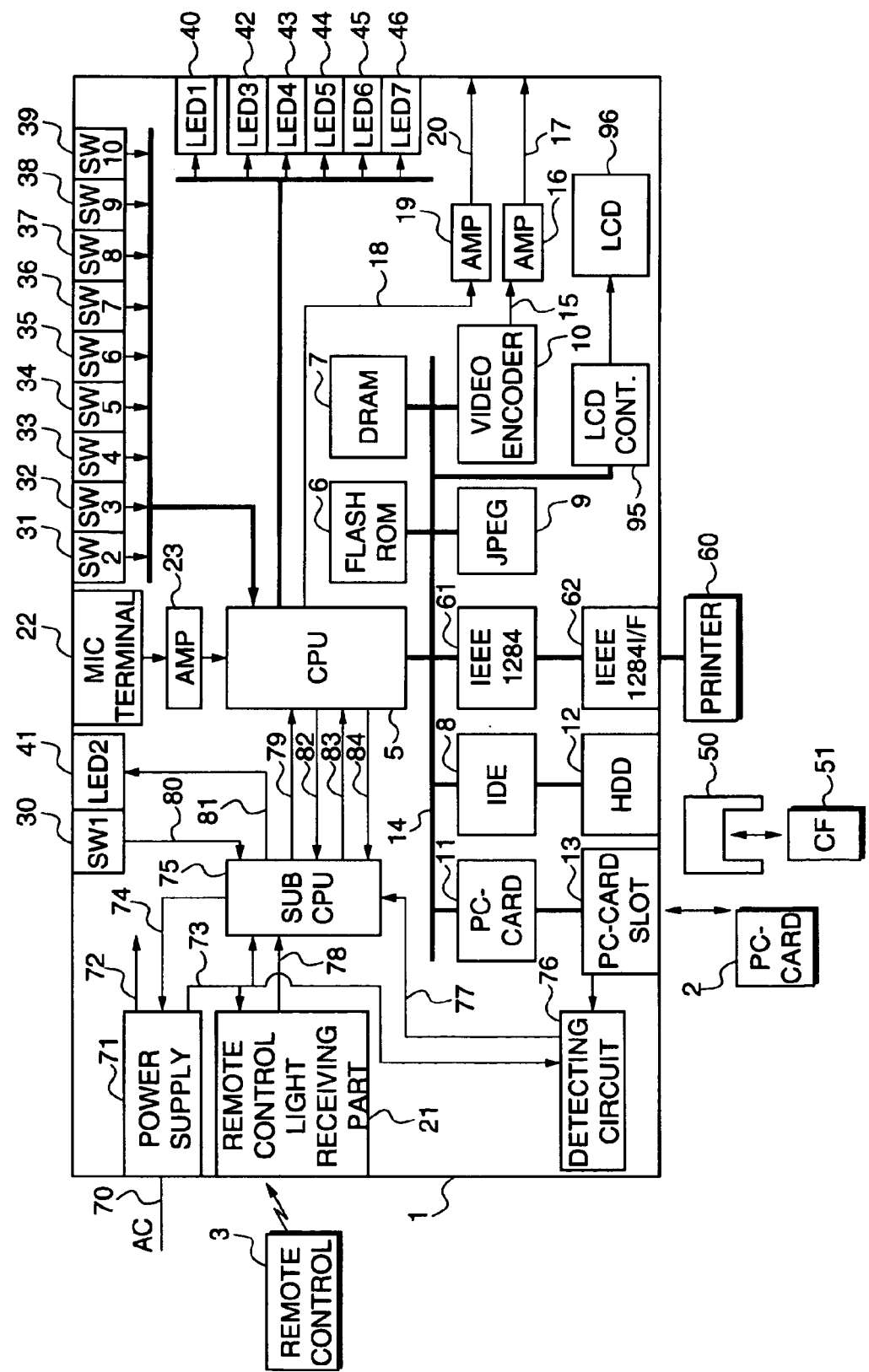
FIG. 13 is a block diagram showing the structure of an image storage apparatus according to a second embodiment of the present invention.

Referring next to FIG. 13, there will be explained a second embodiment of the present invention. FIG. 13 is a block diagram showing the structure of an image storage apparatus according to the second embodiment of the present invention. In FIG. 13, the same blocks as those in FIG. 2 are denoted by the same reference numerals, and they will not be explained hereinbelow.

The second embodiment is different from the first embodiment in that the image storage apparatus has a built-in display unit. More specifically, the image storage apparatus is provided with a liquid crystal display part LCD 96 and a liquid crystal display control circuit LCD 95. This enables the downloading while confirming the images in the CF card 51 outdoors for example without preparing the TV 4.

In each embodiment explained above, the flash ROM 6 contains the programs for executing the automatic downloading process, the album making process, the PC card display mode and the like. This invention, however, should not be restricted to this. For example, another storage medium such as a floppy disk, a CD ROM and an MO may also contain and supply the programs. In this case, the object of the present invention can be accomplished by reading the programs from the storage medium and executing them. Therefore, the storage medium containing the program is a component of the present invention.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image storage apparatus comprising:

receiving means for receiving images and thumbnail images for managing the images stored in a storage medium;

storage means for storing the images and thumbnail images received through said receiving means from said storage medium;

thumbnail image generating means for generating thumbnail images of a predetermined size;

thumbnail image size detecting means for detecting a size of the thumbnail images stored in said storage medium:

copy instruction means for giving an instruction to copy the images stored in said storage medium into said storage means; and control means for executing a control in such a manner as to receive the images from said storage medium through said receiving means and copy the images stored in said storage medium into said storage means when said copy instruction means gives the instruction to copy the images in said storage medium into said storage means;

wherein if the size of the thumbnail images in said storage medium corresponds to the predetermined size, said control means executes a control in such a manner as to receive the thumbnail images from said storage medium through said receiving means and copy the received thumbnail images into said storage means as management thumbnail images for the images copied into said storage means.

2. An image storage apparatus according to claim 1, further comprising erasing means for erasing images from said storage medium after the images in said storage medium are copied into said storage means.

3. An image storage apparatus according to claim 1, further comprising display means for displaying images stored in said storage means.

4. An image storage apparatus according to claim 1, wherein said copy instruction means has a switch that can be operated by a user, and when said switch is operated, said copy instruction means outputs a signal indicative of the copy instruction to said control means.

5. An image storage apparatus according to claim 1, wherein said copy instruction means comprises a remote control unit having a copy instruction button, and when said button is operated, said copy instruction means outputs a signal indicative of the copy instruction to said control means.

6. An image storage method comprising the steps of:

receiving images and thumbnail images stored in a storage medium from said storage medium;

detecting a size of the thumbnail images stored in said storage medium;

executing a control in such a manner as to receive the images from said storage medium and copy the received images into storage means; and if the size of the thumbnail images in said storage medium corresponds to a predetermined size, executing a control in such a manner as to receive the thumbnail images from said storage medium and copy the received thumbnail images into said storage means as thumbnail images for managing the images copied into said storage means.

7. An image storage method according to claim 6, further comprising the step of:

erasing the images from said storage medium after receiving the images in said storage medium and copying the received images into said storage means.

8. An image storage method according to claim 6, further comprising the step of:

displaying the images copied into said storage means.

\* \* \* \* \*